United States Patent [19]

Deleganes et al.

[11] Patent Number: 4,561,049
[45] Date of Patent: Dec. 24, 1985

[54] CONTROL SYSTEM EMPLOYING A ROTARY KNOB

[75] Inventors: Sam M. Deleganes, Aloha; Steven C. Den Beste, Beaverton, both of Oreg.

[73] Assignee: Tektronix, Inc., Beaverton, Oreg.

[21] Appl. No.: 478,140

[22] Filed: Mar. 23, 1983

[51] Int. Cl.[4] .......................... G05B 9/02; G06F 3/14
[52] U.S. Cl. ................................. 364/130; 364/141; 364/188; 340/710; 340/723; 340/726
[58] Field of Search ............... 364/130, 141, 188, 190; 340/709, 710, 723, 724, 725, 726, 359; 318/591

[56] References Cited

U.S. PATENT DOCUMENTS

| | | | |
|---|---|---|---|
| 3,541,541 | 11/1970 | Engelbart | 171/18 X |
| 3,729,129 | 4/1973 | Fletcher et al. | 364/190 X |
| 3,898,438 | 8/1975 | Nater et al. | 364/190 X |
| 3,946,363 | 3/1976 | Hakozaki | 364/200 |
| 4,042,867 | 8/1977 | Schaffer et al. | 318/591 X |
| 4,122,518 | 10/1978 | Castleman et al. | 364/190 X |
| 4,190,834 | 2/1980 | Doornink | 340/709 |
| 4,223,257 | 9/1980 | Miller | 364/190 X |
| 4,527,230 | 7/1985 | Sato et al. | 364/188 X |

FOREIGN PATENT DOCUMENTS

WO82/01601 5/1982 PCT Int'l Appl. ............... 318/591

Primary Examiner—Jerry Smith
Assistant Examiner—Jon D. Grossman
Attorney, Agent, or Firm—Robert S. Hulse; George T. Noe

[57] ABSTRACT

A microprocessor controlled system is provided which is responsive to displacement information such as rotation rate and position of a rotary knob for controlling instrument functions such as display scrolling, the setting and display of measurement conditions (operating parameters), and the entering and display of alphanumeric data.

5 Claims, 6 Drawing Figures

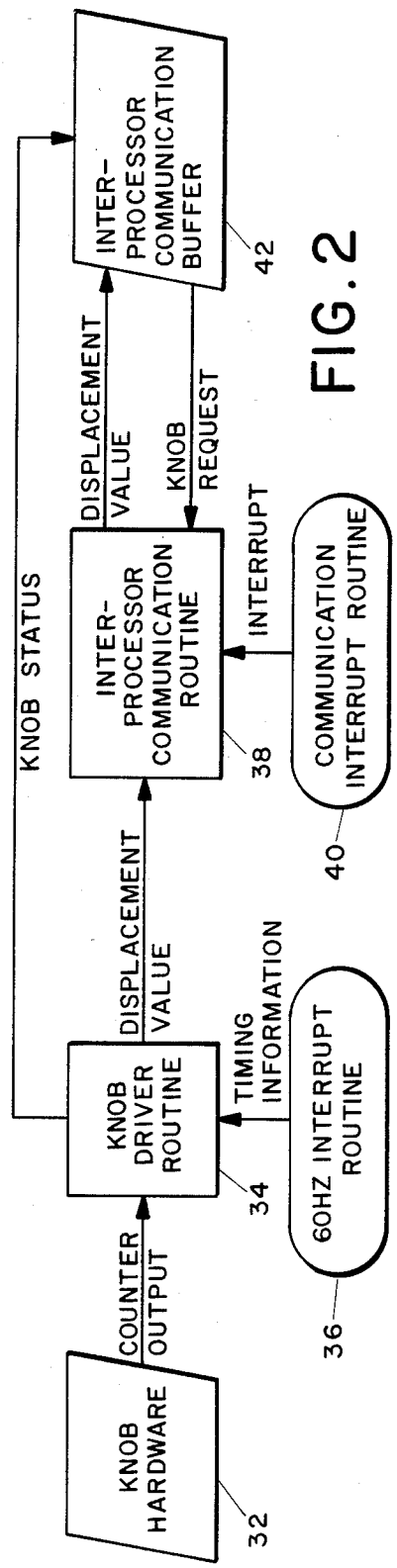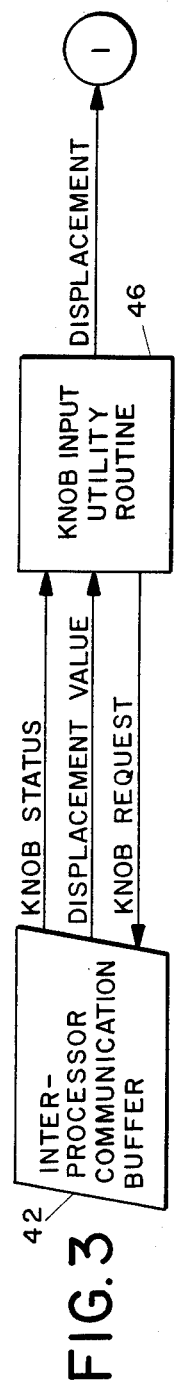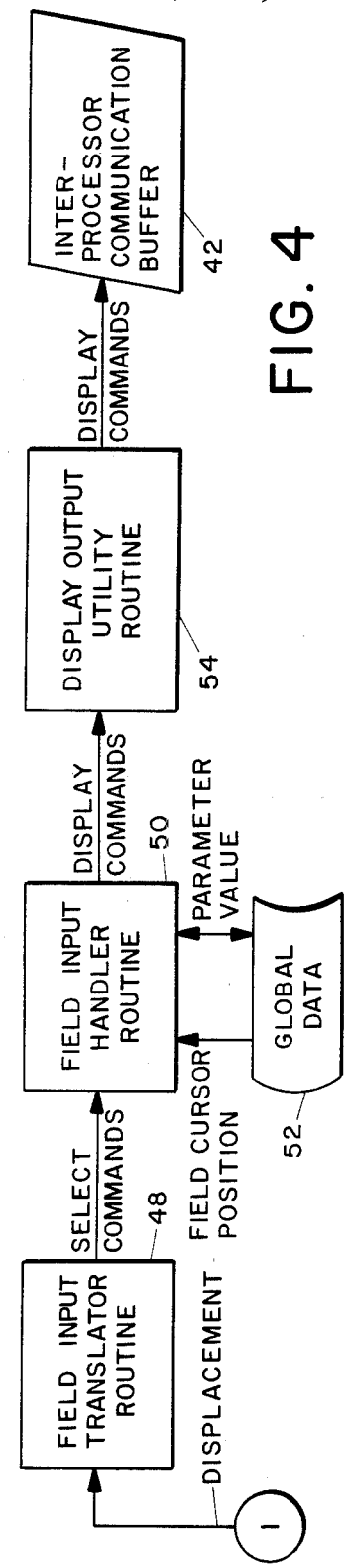

CONTROL SYSTEM EMPLOYING A ROTARY KNOB

BACKGROUND OF THE INVENTION

The present invention relates generally to a system for controlling a signal-measuring instrument using a displacement mechanism and, more specifically, to a microprocessor controlled system where said mechanism is a rotary knob.

Many electronic mesurement instruments include microprocessor systems for improving signal measurement functions. In certain of these instruments, key switches are used to set measurement conditions, to control data display scrolling operations, or to enter alphanumeric data such as labels. Sometimes one or more keys, (e.g., increment and decrement keys) are used to alter a parameter setting or data value, or to control the scrolling operation, each depression of the key causing a predetermined next data value, parameter setting, or address (location) to be displayed. Usually when a key is held down, successive changes in data values or locations are made to occur at a predetermined fixed rate of progression. Often this causes "overshoot", where the equipment setting has progressed to a point beyond the desired setting value or location, obliging the user to initiate the setting process again, and to progress more slowly to the desired setting. Typically the progression rate chosen is either too slow to move conveniently through a large number of setting values or acquired data, or too fast to properly examine each value or data location. Such instruments usually also require the use of a full typewriter-like keyboard, complete with shift key for entry of alphanumeric data.

As control systems, these instruments are generally quite complex, underscoring the need for simpler systems capable of performing data entry and parameter setting operations.

SUMMARY OF THE INVENTION

According to the illustrated preferred embodiment of the present invention, a system is provided which is responsive to actuation of a manually operable rotary knob for controlling display scrolling, the setting of measurement conditions (parameters), and the entering of alphanumeric data. The rotary knob is used to position or actuate a mechanical (or opto-electronic) switch which generates a two-bit Gray code in accordance with the rotation of the knob. This Gray code is used to generate an increment/decrement signal (i.e., a U/D or up/down signal) and a clock signal for a counter, the increment/decrement signal representing the direction of rotation of the knob, and the frequency of the clock signal representing the rotation rate. The contents of the counter, which can be read by a microprocessor, is used as a delta value representing a change to be made to stored data. The changed data, in turn, represents a new parameter value, an alphanumeric input, or a control value for data scrolling. For user convenience, the changed data is displayed on a CRT screen.

Since the rate at which data changes are made and, hence, new data values are generated (the repetition rate) is proportional to the rate at which the user turns the knob, a large range of values may be generated conveniently. This rate control, coupled with specialized display circuitry, gives the user better control over data scrolling and other data display functions. If the user wishes to examine each entry or each display location, the knob may be turned slowly. If the user already knows what value is desired, or wishes to quickly scroll through the data to be displayed, a faster knob rotation rate may be used. Furthermore, the use of the knob for multiple functions facilitates instrument operation because it reduces the number of controls needed to operate the instrument. Since only one knob is used to set instrument parameters, scroll the display, and enter alphanumeric data, the present invention promises considerable user convenience.

BRIEF DESCRIPTION OF THE DRAWINGS

FIG. 2 is a flow chart showing the operation of the invention of FIG. 1 for converting knob rotation to displacement information;

FIG. 3 is a flow chart showing the operation of the invention of FIG. 1 for acquiring displacement information;

FIG. 4 is a flow chart showing the operation of the invention of FIG. 1 for translating displacement information into parameter and display modifications;

DESCRIPTION OF THE PREFERRED EMBODIMENT

Figure 1:
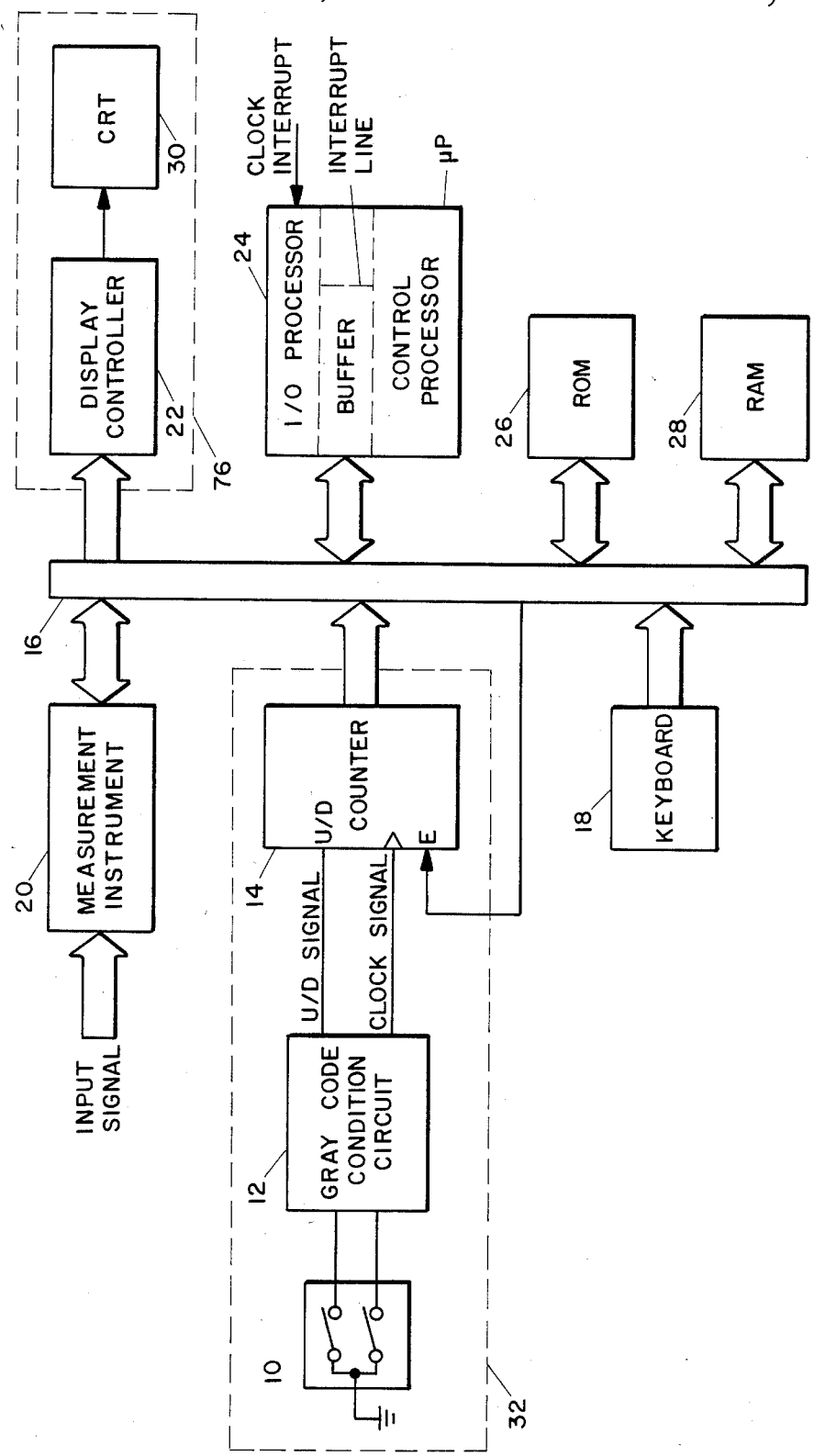
FIG. 1 is a block diagram of a preferred embodiment of the present invention.

Referring to FIG. 1, there is shown a block diagram of a preferred embodiment of the present invention. Switch 10 is a conventional mechanical or opto-electronic switch for generating a two-bit Gray-code in accordance with rotation of a knob (not shown). This figure shows the mechanical type Gray code generation switch, wherein two contacts are controlled by the knob so as to generate the Gray code. Gray-code condition circuit 12 receives the Gray-code output from switch 10, and generates an increment/decrement (high/low) signal representing the direction of turn of the knob, and a clock signal the number of pulses of which is determined by the extent or distance to which the knob is turned. Up/down counter 14 receives the increment/decrement signal and the clock signal from circuit 12 at the up/down control terminal (U/D) and the clock terminal, respectively. The contents of counter 14 is controlled by rotation of the knob of switch 10. Counter 14 also receives, at its enable terminal (E), an enable signal from bus 16 consisting of data, address and control lines. The combination of switch 10, circuit 12 and counter 14 comprises knob hardware 32 as disclosed in Japanese Published Unexamined Patent Application No. 54-36194 and UM Application No. 57-67435, both of which were assigned to the assignee of this patent application. The output signal from counter 14 is applied to bus 16. Keyboard 18 is used as an alternate input device connected to bus 16. Measurement instrument 20 such as a logic analyzer acquires an input signal and measures it under control of instruction signals from bus 16, and the measurement results are applied to bus 16. Bus 16 is further connected to display control circuit 22, microprocessor ($\mu$P) 24, Read Only Memory (ROM) 26 and Random Access Memory (RAM) 28. Display control circuit 22 controls cathode ray tube (CRT) 30 for displaying measurement results and setting values of measurement instrument 20 or the like. Under control of µP 24, circuit 22 also controls data display corresponding to knob movement. µP 24 includes two µP sections, one section operating as a control processor for controlling the operation of measurement instrument 20, and the other section operating as an Input/Output (I/O) processor for controlling the operations of counter 14, keyboard 18 and display control circuit 22. The control and I/O processor sections may be an 8088 and a Z-80, respectively. µP 24 operates under control of software stored in ROM 26. RAM 28 acts as temporary storage under control of µP 24.

The contents of counter 14 is read by the I/O processor under software control. This software, which is stored in ROM 26, includes knob driver routine 34, interrupt handler routine 36, interprocessor communication routine 38, and communication interrupt driver routine 40, as shown in FIG. 2. The I/O processor, under control of the knob driver routine 34 and interrupt handler (scheduler) routine 36, reads the counter output from knob hardware 32 sixty times per second in accordance with a timing signal applied from a 60 Hz interrupt clock (not shown). The counter outputs represent knob displacements. The I/O processor, under control of the knob driver routine 34, converts each displacement into a signed integer at each clock interrupt, cumulates successive integers, and stores the cumulated value in RAM 28. The cumulated value represents the change in position of the knob since the last request for knob information by the I/O processor. Further, the I/O processor, under control of routine 34, applies a signal to the control processor notifying the control processor through interprocessor communication buffer 42 that knob movement has occurred. When it is ready to receive knob information, the control processor applies an interrupt signal to interrupt driver routine 40 of the I/O processor. The I/O processor, under control of routine 38, passes the knob displacement integer information from RAM 28 to buffer 42. (Optionally, as shown in FIG. 3, the I/O processor, under control of a utility routine 46, may cause this information to be forwarded from buffer 42 to RAM 28.) Interrupt routine 40 then conveys to the control processor the address of the knob displacement integer information in RAM 28. Alternatively, where RAM 28 is partitioned or divided such that a first portion services the I/O processor and a second portion services the control processor, the interrupt driver routine 40 would set a flag in the first RAM portion in response to the interrupt signal from the control processor. In response to this flag the I/O processor, under control of routine 38, passes the knob displacement integer information from RAM 28 to the control processor through interprocessor communication buffer 42 and sets the cumulative count in RAM 28 to zero. Thus, the knob displacement information is transferred to the control processor from the I/O processor via buffer 42.

The control processor operates to set parameter values to scroll data, and to enter alphanumeric data in accordance with knob displacement information stored in the RAM by knob input utility routine 46. Parameter and alphanumeric data values that are entered or set via knob rotation are displayed on CRT 30. A movable blinking field cursor displayed on the face of the CRT is positioned by the user to specify (select) which of a plurality of displayed values (corresponding to global data values stored in RAM 28) he wishes modified. The selected value is then modified in response to rotation (displacement) of the knob, as shown in FIG. 4.

The control processor operates under control of software stored in ROM 26 including knob input utility routine 46, field input translator routine 48, input field handler routine 50, and display output utility routine 54. Under control of these routines, the control processor modifies the global data value corresponding to the parameter value selected by the blinking field cursor. Field input translator 48 operates in conjunction with knob input utility routine 46 to acquire the knob displacement information, and translates this information into an appropriate "select" command. This command represents a delta quantity by which the selected parameter value is to be changed. The command is applied to field input handler 50, which modifies the parameter value (field) based on pre-established significance (e.g., number and type) of the command. In response to a select command applied by translator 48, handler 50 accesses global data 52 (corresponding to field cursor position) in RAM 28, and modifies the accessed data in accordance with the select command. This modified data is then stored in RAM 28, and a display command corresponding to the modified data is applied to display output utility routine 54. This utility routine 54 transfers the display commands to interprocessor communication buffer 42 for later access and use by the I/O processor in changing the information displayed on CRT 30, so as to have it correspond to the modified data.

Figure 5:
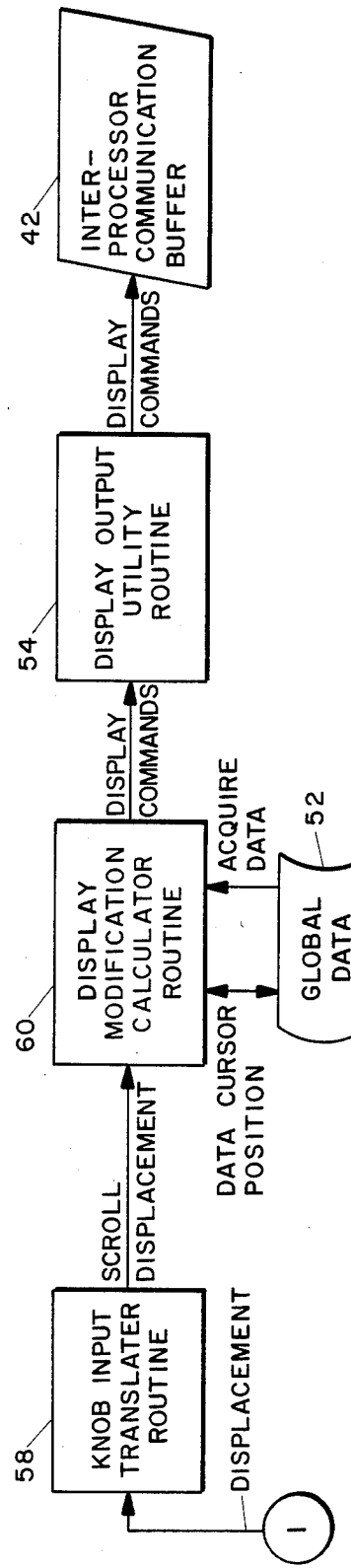
FIG. 5 is a flow chart showing the operation of the invention of FIG. 1 for translating displacement information into information for controlling data scrolling.

FIG. 5 shows how the control processor accomplishes data scrolling operations in response to knob displacement. The control processor operates under control of software stored in ROM 26 including knob input translator routine 58, display modification calculator routine 60, and display output utility routine 54. Under control of these routines, the control processor modifies the global data value corresponding to the data cursor position, said position being representative of a data line (e.g., horizontal or vertical line) being displayed. Knob input translator 58 operates in conjunction with knob input utility routine 46 to acquire the knob displacement information, and translates this information into an appropriate amount (value) of scroll displacement. This scroll displacement value represents a delta quantity (increment or decrement) by which the data cursor position is to be changed (e.g., vertically or horizontally). The scroll displacement value is applied to display modification calculator routine 60 which accesses global data 52 corresponding to the data cursor position and to acquired data in RAM 28 for display on CRT 30. Using this information, routine 60 modifies the accessed data in accordance with the scroll displacement value and generates display commands describing the scroll operation, which commands are applied to display output utility routine 54. This utility routine 54 transfers the display to the interprocessor communication buffer 42 for later access by the I/O processor in changing the information displayed on CRT 30 to have it correspond to the new data cursor position.

Figure 6:
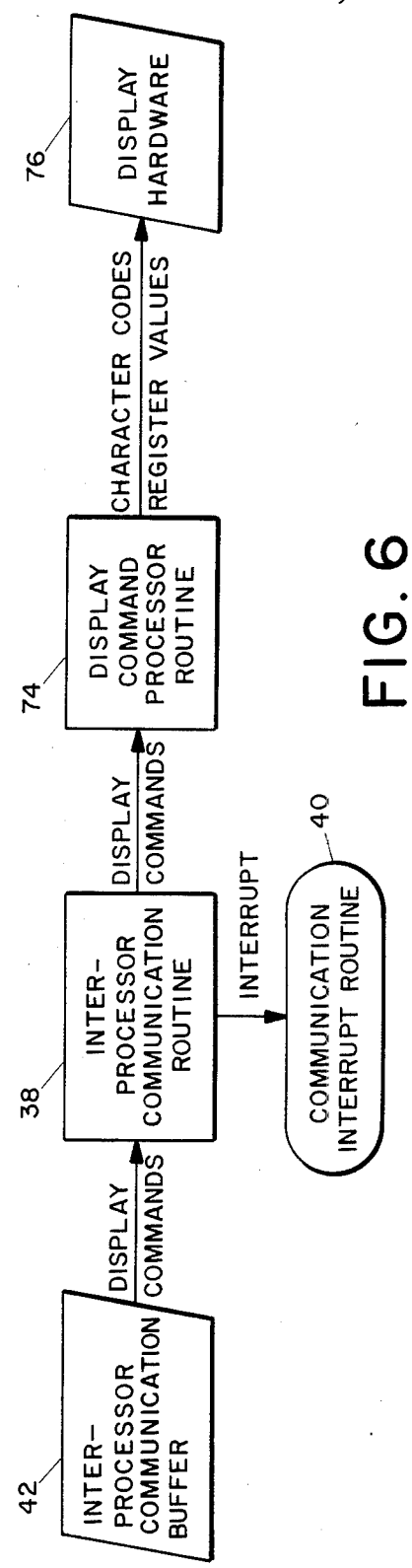
FIG. 6 is a flow chart showing the operation of the invention of FIG. 1 for changing displayed data in accordance with displacement information.

The display commands from display output utility 54 shown in FIGS. 4 and 5 are processed by the I/O processor under control of software stored in ROM 26 including interprocessor communication routine 38, communication interrupt driver routine 40, and display command processor routine 74, as shown in FIG. 6. The display commands are acquired from the control processor through interprocessor communication buffer 42 by interprocessor communication module routine 38 in response to the interrupt from communication interrupt driver routine 40. The display commands are applied by routine 38 to display command processor routine 74. This processor 74 translates the display commands to character codes and display control register values, and applies these codes and register values to display hardware 76 consisting of display control circuit 22 and CRT 30.

From the above description, therefore, it is seen that by means of the system of the present invention, display data may be scrolled, and parameter and alphanumeric data values may be entered and changed by operation of a mechanism, such as a rotary knob, capable of specifying a displacement. Other such mechanisms may be a linear control mechanism, joystick, trackball, thumbwheel, or the like. The mode of operation of the system (e.g., entering data, setting a parameter value, or scrolling the display) may be selected via keyboard 18.

It will be obvious to those having ordinary skill in the art that many changes may be made in the above-described details of the preferred embodiment of the present invention. For example, a single processor may act as both the control and I/O processors, or the interprocessor communication buffer may be replaced with a dual-port RAM. Detailed listings of program instructions and data of the various routines are presented following the detailed description of the invention.

KNOB DRIVER ROUTINE

```
iopfgnd/knobhand.z80 Page 1

; **********************************************************************
; *
; *     NAME:     KNOBHAND, I_KNOBHAND     (@(#)knobhand.z80      1.2)
; *
; *
; *
; *
; *
; *                                    Name      Revision
; *                                    ----      --------
; *                                    SMD       Regular
; *                                    CJB       Removed SCCSid ('what' string)
; *
; **********************************************************************
;
;# M-E : CH06/knobhand
;
;# VD  : CH13/d.knobchange : full
;# VD  : CH13/d.knobchange : leverage
;
;extern  int      full;
;extern  char     leverage;
;
;extern  setstatus( );
;extern  clrstatus( );
;
        NAME     knobhand
        GLOBAL   knobhan.
        GLOBAL   i_knobh.
        GLOBAL   clrstat.
        GLOBAL   setstat.
        GLOBAL   leverag.
        GLOBAL   full.
;
;#define          KNOBHWVAL     0xAAFF -> absbase
                                /* This is the HW interface to the knob. */
;#define CLEARTIME         31
                                /* If the knob is not moved for this many */
                                /* ticks, the knob values are reset. */
;
KINFO   EQU      02H
KNOB    EQU      0AAFFH
CLR     EQU      01FH
;
        BSS                     /* uninitialized variable section */
;
;static  char     lastknobpos = {0};   /* saves the position of the knob */
                                       /* the last time knobhand was called */
;static  char     idletime    = {0};   /* number of ticks since the last */
                                       /* movement of the knob */
```

```
;static char     oldremainder = {0}; /* amt of knob movement not used */
;                                    /* in the last update of 'full' */
;
;static int      oldfull = 0;        /* indicates if 'full' was changed */
;

SECTION B.knobhand,CLASS=BSS
lastkno.         BYTE     00H
idletim.         BYTE     00H
oldrema.         BYTE     00H
oldfull.         WORD     00H ;        TEXT                                          /* code section */
;
;/***********************************************************************/
;
;i_knobhand()
;{
;        idletime = full = oldremainder = 0;
;        leverage = 3;
;        lastknobpos = KNOBHWVAL;
;        return;
;}
;
         SECTION T.knobhand,CLASS=TEXT i_knobh.                                  ; CANNOT USE DE
         XOR     A
         LD      (oldrema.), A
         LD      (full.), A
         LD      (full.+01H), A
         LD      (idletim.), A
         LD      A, 03H
         LD      (leverag.), A
         LD      A, (KNOB)
         LD      (lastkno.), A
         RET ;
;/***********************************************************************/
;
;knobhand()
;{
;        if (KNOBHWVAL != lastknobpos) {        /* the knob has moved */
;                                               /* calculate change amt */
;                oldremainder += KNOBHWVAL - lastknobpos;
;
;                lastknobpos = KNOBHWVAL;       /* save knob position */
;                                               /* update 'full' */
;                oldfull = full;
;                if (oldremainder < 0) {
;                        while ((oldremainder += leverage) <= 0)
;                                --full;
;                        oldremainder -= leverage;
;                } else {
;                        while ((oldremainder -= leverage) >= 0)
;                                ++full;
;                        oldremainder += leverage;
;                }
;
;                if (oldfull != full)           /* inform the CP */
;                        setstatus(KNOBINFO);
;
;                idletime = CLEARTIME;  /* reset idle time counter */
;        } else if (idletime) {
;                if (!(--idletime)) {   /* clear pending knob info */
;                        clrstatus(KNOBINFO);
```

```
;                            oldremainder = 0;
;                            full = 0;
;                  }
;         }
;         return;
;}
;

knobhan.                               ; CANNOT USE DE
          LD    HL, lastkno.           ; is knob == lastknobpos
          LD    A, (KNOB)
          CP    (HL)
          JR    Z, L.3
          SUB   (HL)                   ; A = knob - lastknobpos
          LD    HL, oldrema.           ; oldremainder += A
          ADD   A, (HL)
          LD    B, A                   ; FROM THIS POINT
          LD    A, (leverag.)          ; B = oldremainder
          LD    C, A                   ; C = leverage
          LD    A, (KNOB)              ; lastknobpos = knob
          LD    (lastkno.), A
          LD    HL, (full.)            ; oldfull = full
          LD    (oldfull.), HL         ; FROM THIS POINT HL = full
          LD    A, B                   ; is oldremainder < 0
          OR    A
          JP    P, L.51
L.7       LD    A, B                   ; oldremainder += leverage
          ADD   A, C
          LD    B, A
          SUB   A                      ; is oldremainder <= 0
          CP    B
          JP    M, L.11
          DEC   HL                     ; full--
          JR    L.7
L.3       LD    A, (idletim.)          ; is idletime != 0
          OR    A
          RET   Z
          DEC   A                      ; is --idletime != 0
          LD    (idletim.), A
          OR    A
          RET   NZ
          LD    HL, KINFO              ; clrstatus(KNOBINFO)
          PUSH  HL
          CALL  clrstat.
          POP   AF
          XOR   A                      ; oldremainder = full = 0
          LD    (oldrema.), A
          LD    (full.), A
          LD    (full.+01H), A
          RET
L.11      LD    A, B                   ; oldremainder -= leverage
          SUB   C
          JR    L.31                   ; oldremainder about to be saved
L.51      LD    A, B                   ; oldremainder -= leverage
L.52      SUB   C
          OR    A                      ; is oldremainder >= 0
          JP    M, L.71
          INC   HL                     ; full++
          JR    L.52
L.71      ADD   A, C                   ; oldremainder += leverage
L.31      LD    (full.), HL            ; save full
          LD    (oldrema.), A          ; save oldremainder
          LD    A, (oldfull.)          ; is oldfull == full
          XOR   H
          JR    NZ, L.2
          LD    A, (oldfull.+01H)
          XOR   L
L.2       JR    Z, L.12
```

```
              LD    HL, KINFO      ; setstatus(KNOBINFO)
              PUSH  HL
              CALL  setstat.
              POP   AF
L. 12         LD    A, CLR         ; idletime = CLEARTIME
              LD    (idletim.), A
              RET
              END
```

*60Hz and Communication Interrupt Routines* iopfgnd/inthand.z80 Page 1

```
;************************************************************
;                                                            *
;       MODULE NAME:   inthand  (@(#)inthand.z80 1.9)        *
;                                                            *
;                                                            *
;                                                            *
;                                                            *
;                                                            *
;                  Name    Revision                          *
;                  KM      Regular                           *
;                  SMD     2nd DC version                    *
;                  SMD     Corrected bit masking.            *
;                  SMD     Corrected what string.            *
;                  SMD     Corrected comm port int handler reference*
;                  CJB     Moved SCCSid to DATA section.     *
;                  SMD     Corrected bit masking some more   *
;                  CJB     Removed SCCSid ('what' string)    *
;                  SMD     changed interrupt vector address  *
;                  SMD     saves IX and IY                   *
;                                                            *
;************************************************************

;# M-E : CH11/inthand *

;************************************************************

;******************************
;                             *
;    Local Defines            *
;                             *
;******************************
;
; COMMHIGH      address of the comm pack interrupt handler vector
; MASKALL       mask register value to mask all interrupts
; MASKTMG       used to compute the new mask register value
;               when the 60 hz Timing Interrupt is serviced.
; MASKCP        used to compute the new mask register value
;               when the Control Processor Interrupt is serviced.
; MASKCOMM      Initial Mask register value to mask Comm Pack
;               interrupts
; INITMASK      Initial Mask register value to enable ALL interrupts
;               (Comm Pack installed).
; VECTPAGE      This is the page of the location of the interrupt
;               vector. When an interrupt occurs, this value is
;               used as the most significant byte of a 2 byte
;               address. The least significant byte is supplied
;               by the hardware. The memory location at the
;               address contains the address of the Interrupt
;               Service routine ('inthand').
;
;

NAME     inthand

COMMHIGH         EQU      0C002H
```

```
MASKALL         EQU     01CH
MASKTMG         EQU     03CH
MASKCP          EQU     0BCH
MASKCOMM        EQU     0DCH
INITMASK        EQU     0FCH
VECTPAGE        EQU     02CH

;*******************************
;                              *
;   External Routines          *
;                              *
;*******************************

GLOBAL  beepmak.
        GLOBAL  blinkde.
        GLOBAL  kbmon.
        GLOBAL  knobhan.
        GLOBAL  scrolld.
        GLOBAL  stopwat.
        GLOBAL  tmgscrd.
        GLOBAL  cpint.

;*******************************
;                              *
;   External Variables         *
;                              *
;*******************************

GLOBAL  maskbit.
        GLOBAL  intcaus.
        GLOBAL  intmask.
        GLOBAL  packtyp.

;# VD : CH13/d.cntldata:maskbits *
;# VD : CH13/d.iopint:intcause *
;# VD : CH13/d.iopint:intmask *
;# VD : CH13/d.cntldata:packtype *

;*******************************
;                              *
;   Local Data                 *
;                              *
;*******************************
;
;
;  'clrtmg' is the hardware location accessed
;     to clear the 60 hz Timing Interrupt line.
;

SECTION A.inthand,ABSOLUTE

ORG     0AD80H
clrtmg.         BYTE    00H

GLOBAL  inthand.
        GLOBAL  i_intha.

SECTION T.inthand,CLASS=TEXT i_intha.
```

```
;   This is the initialization routine for 'inthand'.
;   This routine exists to initialize the Interrupt
;   Mask register, set the IOP to Interrupt Mode 2,
;   and initialize the I register.
;
;   If the Comm Pack is not installed, the Comm Pack
;   interrupt is continuously asserted by the hardware.
;   So if there is not a Comm Pack installed, the initial
;   interrupt mask must mask this interrupt.
;
;   This routine assumes that the global variable 'packtype'
;   has been initialized.
;

LD      A, VECTPAGE     ;set Interrupt mode 2 with
            LD      I,A             ;vector at 02CFF
            IM      2

LD      A,(packtyp.)
            OR      A
            JP      Z,nopack.

LD      A, INITMASK     ;Comm Pack is installed
            JP      exit_i.

nopack.     LD      A, MASKCOMM     ;Comm Pack is not installed exit_i.     LD      (maskbit.),A
            LD      (intmask.),A
            RET inthand.

;
;   Welcome to the interrupt handler for the IOP.
;   This is the module which is executed everytime an
;   interrupt occurs in the IOP.  The IOP is a Z80
;   (just in case you didn't know) and it is programmed
;   to use Interrupt Mode 2.  In Mode 2 the acceptance of
;   an interrupt causes the processor to form a pointer to
;   a location in memory which contains the address of the
;   Interrupt service routine.
;   The high order 8 bits of the pointer are taken from
;   the I register and the low order 8 bits of the pointer
;   are placed on the bus by the interrupting device.
;   In our case the low order 8 bits will always be FF.
;   The I register will be loaded at powerup before
;   interrupts are disabled.  The location referenced
;   by the pointer mentioned above will contain the
;   address of this routine.
;
;
;   First we save the current status on the stack.  An
;   important part of the current status is the current
;   interrupt mask setting.
;   Then the source of the interrupt must be determined.
;   This is done by ANDing the current mask with the
;   contents of the Pending Interrupts Register - 'intcause'.
;   The result is the pending enabled interrupts (there could
;   be more than one).  Of the pending enabled interrupts, the
;   one with the highest priority is serviced.
;
;   The interrupt priority is:
;
```

```
;       Highest:    Comm Pack high
;       next:       60 hz Timing
;       Lowest:     Control Processor
;

PUSH    IX
        PUSH    IY
        PUSH    BC
        PUSH    DE
        PUSH    HL
        PUSH    AF
        LD      A,(maskbit.)            ;save current mask on stack
        PUSH    AF
        RRA                             ;line up mask bits
        RRA
        RRA
        RRA
        LD      B,A
        LD      A,(intcaus.)            ;read pending interrupts
        AND     B                       ;mask off disabled interrupts
        BIT     1,A
        JR      NZ,chiint.
        BIT     3,A
        JR      NZ,tmgint.
        BIT     2,A
        JR      NZ,conint.
        JP      exit.                   ;exit if no pending interrupts
; At this point it is known which interrupt we are going
; to service. The actions taken are very much the same
; regardless of the specific interrupt to be serviced:
; All interrupts of equal or lower priority are masked
; by putting a new mask value in 'maskbits' and 'intmask'.
; Then interrupts are enabled to allow interrupts of higher
; priority and the appropriate interrupt service routine is
; called.
;

chiint. LD      A,MASKALL
        LD      (maskbit.),A
        LD      (intmask.),A            ;mask all interrupts
        EI
        CALL    COMMHIGH                ;call interrupt service routine
        JP      exit.

tmgint. LD      A,(maskbit.)
        AND     MASKTMG                 ;mask 60 hz and CP interrupts
        LD      (maskbit.),A
        LD      (intmask.),A
        EI
        LD      A,(clrtmg.)             ;clear the 60 hz Interrupt
        CALL    beepmak.
        CALL    blinkde.
        CALL    kbmon.
        CALL    knobhan.
        CALL    scrolld.
        CALL    stopwat.
        CALL    tmgscrd.
        JP      exit.

conint. LD      A,(maskbit.)
        AND     MASKCP                  ;mask CP interrupt
        LD      (maskbit.),A
        LD      (intmask.),A
        EI
        CALL    cpint.
```

```
;
;   All good things must come to an end.  It's time
;   to leave 'inthand' so we restore the old interrupt
;   mask which was saved on the stack, restore the
;   contents of the registers, enable interrupts and
;   return.
;

exit.    DI
         POP      AF
         LD       (maskbit.),A
         LD       (intmask.),A
         POP      AF
         POP      HL
         POP      DE
         POP      BC
         POP      IY
         POP      IX
         EI
         RET
```

INTERPROCESSOR COMMUNICATION ROUTINE iopf_nd/cpint.z80 Page 1

```
;******************************************************************
;
;        NAME:    CPINT  (@(#)cpint.z80      1.9)
;
;
;
;
;               Name    Revision
;               SMD     Regular
;               SMD     Corrected race condition when data transfer from
;                         CP is blocked.
;               SMD     Added debug version of cpdelay loop.
;               SMD     Lengthened debug version of cpdelay loop.
;               SMD     Corrected descripq pointer bookkeeping.
;               KM      Changed transaction E - 'rtlflg'.
;               CJB     Moved SCCSid to DATA section.
;               KM      Transaction 4 ('errlinstat') should also
;                         set 'cstatchgflg'.
;                       Transaction A (hostmessages) modified so
;                         it can handle messages of length 2.
;               CJB     Removed SCCSid ('what' string)
;
;******************************************************************

;# M-E : CH11/cpint

;******************************************************************

NAME     cpint

GLOBAL   abortfl.        ; char  abortflg
         GLOBAL   beepflg.        ; char  beepflg
         GLOBAL   beeptyp.        ; char  beeptype
         GLOBAL   commout.        ; char  commout[]
         GLOBAL   commque.        ; char  commqueue[]
         GLOBAL   coutflg.        ; char  coutflg
         GLOBAL   cpdownc.        ; int   cpdowncnt
         GLOBAL   cpnewke.        ; char  cpnewkey
         GLOBAL   cstatch.        ; char  cstatchgflg
         GLOBAL   descrip.        ; char  descripq[]
```

```
        GLOBAL    dqinptr.          ; char   *dqinptr
        GLOBAL    dqoutpt.          ; char   *dqoutptr
        GLOBAL    errlins.          ; char   errlinstat
        GLOBAL    full.             ; int    full
        GLOBAL    hostmes.          ; char   hostmess[]
        GLOBAL    hwhands.          ; char   hwhandshake
        GLOBAL    hwstatu.          ; char   hwstatus
        GLOBAL    intcaus.          ; char   intcause
        GLOBAL    leverag.          ; char   leverage
        GLOBAL    mystatu.          ; char   mystatus
        GLOBAL    newcenf.          ; char   newcenflg
        GLOBAL    newcens.          ; char   newcensor
        GLOBAL    packtyp.          ; char   packtype
        GLOBAL    ptymess.          ; char   ptymess
        GLOBAL    qclear.           ; char   qclear
        GLOBAL    rpradix.          ; char   rpradix[]
        GLOBAL    rtlflg.           ; char   rtlflg
        GLOBAL    transre.          ; int    transreg GLOBAL    cpint.
        GLOBAL    i_cpint.

SECTION   T.cpint,CLASS=TEXT jmptbl.
        WORD      0                 ; dummy entry
        WORD      trans1.
        WORD      trans2.
        WORD      trans3.
        WORD      trans4.
        WORD      trans5.
        WORD      trans6.
        WORD      trans7.
        WORD      trans8.
        WORD      trans9.
        WORD      transa.
        WORD      transb.
        WORD      transc.
        WORD      transd.
        WORD      transe.

;
; This is the assembler version of the module 'i_cpint'
;

i_cpint.
        LD        A,01H             ; clear queue
        LD        (qclear.),A
        XOR       A                 ; init port related variables
        LD        (hwhands.),A
        LD        (myhands.),A
        LD        (hwstatu.),A
        LD        (mystatu.),A
        LD        (newcenf.),A      ; no pending censor class
        RET ;
; This is the assembler version of the module 'cpint'
;

cpint.
        PUSH      DE                ; subroutine linkage
        LD        A,(commque.)      ; get handler type
        RLCA                        ; get handler address from jmptbl
        LD        L,A
        LD        H,00H
```

```
            LD      DE, jmptbl.
            ADD     HL, DE
            LD      E, (HL)
            INC     HL
            LD      D, (HL)
            LD      HL, retaddr.        ; indirect call
            PUSH    HL
            PUSH    DE
            RET
retaddr.
            DI                          ; clear iack and busy
            LD      A, (mystatu.)
            AND     03FH
            LD      (mystatu.), A
            LD      (hwstatu.), A
            EI
            POP     DE                  ; subroutine linkage
            RET ;
; Transaction 1 - send to descripq
;
trans1.
            LD      A, (commque.)       ; get byte count and save it
            DEC     A                   ; use byte count + 1 to fit message
            LD      E, A                ; in d, e
            LD      D, 00H
            LD      HL, dqoutpt.        ; is 'dqinptr' < 'dqoutptr'
            LD      A, (dqinptr.)
            SUB     (HL)
            LD      A, (dqinptr.+01H)
            INC     HL
            SBC     A, (HL)
            JP      NC, o_b_i.          ; 'dqinptr' is >= 'dqoutptr'
            LD      HL, dqinptr.        ; is ('dqoutptr' - 'dqinptr')
                                        ; < byte count + 1
            LD      A, (dqoutpt.)       ; b, c = ('dqoutptr' - 'dqinptr')
            SUB     (HL)
            LD      C, A
            LD      A, (dqoutpt.+01H)
            INC     HL
            SBC     A, (HL)
            LD      B, A
            LD      A, C                ; compare b, c with byte count + 1
            SUB     E
            LD      A, B
            SBC     A, D
            JP      NC, load.           ; there is room, load it
noroom.
            DI                          ; there is no room
            LD      A, (mystatu.)       ; set iack and busy
            OR      0C0H
            LD      (hwstatu.), A
            LD      (mystatu.), A
            EI
            LD      A, 01H              ; clear queue
            LD      (qclear.), A
cpintw.
            LD      A, (intcaus.)       ; wait for CP to drop interrupt
            AND     04H
            JP      NZ, cpintw.
;           LD      A, 0CH              ; wait for CP to see busy flag
            LD      A, 012H             ; ******** DEBUG ********
cpdelay.
            DEC     A
            JP      NZ, cpdelay.
            RET
``` o_b_i.
```
        LD      HL,dqinptr.             ; is &descripq[256]-'dqinptr'
        LD      BC,descrip.+0100H       ; < byte count + 1
        LD      A,C                     ; b,c = &descripq[256]-'dqinptr'
        SUB     (HL)
        LD      C,A
        LD      A,B
        INC     HL
        SBC     A,(HL)
        LD      B,A
        LD      A,C                     ; is b,c < byte count + 1
        SUB     E
        LD      A,B
        SBC     A,D
        JP      NC,load.                ; there is room, load it
        LD      HL,(dqoutpt.)           ; is ('dqoutptr'-&descripq)
        LD      BC,descrip.             ; < byte count + 1
        LD      A,L                     ; h,l = ('dqoutptr'-&descripq)
        SUB     C
        LD      L,A
        LD      A,H
        SBC     A,B
        LD      H,A
        LD      A,L                     ; is h,l < byte count + 1
        SUB     E
        LD      A,H
        SBC     A,D
        JP      C,noroom.               ; there is no room
        LD      HL,(dqinptr.)           ; wraparound the queue pointer
        LD      (HL),0FFH
        LD      HL,descrip.
        LD      (dqinptr.),HL
load.
        DI                              ; load the message
        LD      A,(mystatu.)            ; set iack to 1
        OR      040H
        LD      (mystatu.),A
        LD      (hwstatu.),A
        EI
        DEC     DE                      ; calculate real byte count
        PUSH    DE                      ; save byte count
        LD      B,D                     ; b,c = byte count
        LD      C,E
        LD      HL,(dqinptr.)           ; d,e = destination
        EX      DE,HL
        LD      HL,commque.             ; h,l = source
        LDIR                            ; do move
        POP     DE                      ; retrieve byte count
        LD      HL,(dqinptr.)           ; update 'dqinptr'
        ADD     HL,DE
        LD      (dqinptr.),HL
        RET
```

;
; Transaction 2 - send to rpradix
;
trans2.
```
        DI                              ; set iack to 1
        LD      A,(mystatu.)
        OR      040H
        LD      (mystatu.),A
        LD      (hwstatu.),A
        EI
        LD      A,(commque.)            ; b,c = byte count
        LD      B,00H
        LD      C,A
        LD      HL,(commque.)           ; d,e = destination
```

```
                LD      DE,rpradix.
                ADD     HL,DE
                EX      DE,HL
                LD      HL,commque.     ; h,l = source
                LDIR                    ; do move
                RET ;
; Transaction 3 - send to commout
;
trans3.
                LD      A,(coutflg.)    ; check 'coutflg'
                OR      A
                JP      NZ,noroom.      ; we're full (see trans1)
                DI                      ; set iack to 1
                LD      A,(mystatu.)
                OR      040H
                LD      (mystatu.),A
                LD      (hwstatu.),A
                EI
                LD      HL,commque.     ; h,l = source
                LD      B,00H           ; b,c = byte count
                LD      C,(HL)
                LD      DE,commout.     ; d,e = destination
                LDIR                    ; do move
                LD      A,01H           ; 'coutflg' = TRUE
                LD      (coutflg.),A
                RET ;
; Transaction 4 - send to errlinstat
;
trans4.
                DI
                LD      A,(mystatu.)    ; set iack to 1
                OR      040H
                LD      (mystatu.),A
                LD      (hwstatu.),A
                EI
                LD      A,(commque.)    ; set errlinstat
                LD      (errlins.),A
                LD      A,01H
                LD      (cstatch.),A    ; set cstatchgflg
                RET ;
; Transaction 5 - send to newcensor
;
trans5.
                DI
                LD      A,(mystatu.)    ; set iack to 1
                OR      040H
                LD      (mystatu.),A
                LD      (hwstatu.),A
                EI
                LD      A,(commque.)    ; set 'newcensor'
                LD      (newcens.),A
                LD      A,01H           ; set 'newcenflg' to TRUE
                LD      (newcenf.),A
                RET ;
; Transaction 6 - send to beeptype
;
``` trans6.
```
        DI
        LD      A,(mystatu.)    ; set iack to 1
        OR      040H
        LD      (mystatu.),A
        LD      (hwstatu.),A
        EI
        LD      A,(commque.)    ; set 'beeptype'
        LD      (beeptyp.),A
        LD      A,01H           ; set 'beepflg' to TRUE
        LD      (beepflg.),A
        RET
```

;
; Transaction 7 - begin time period
;
trans7.
```
        DI
        LD      A,(mystatu.)    ; set iack and time period
        OR      050H
        LD      (mystatu.),A
        LD      (hwstatu.),A
        EI
        LD      HL,(commque.)   ; set 'cpdowncnt'
        LD      (cpdownc.),HL
        RET
```

;
; Transaction 8 - return key input
;
trans8.
```
        LD      A,(cpnewke.)    ; return 'cpnewkey'
        LD      (transre.),A
        DI
        LD      A,(mystatu.)    ; clear key waiting
        AND     0FEH
        OR      040H            ; set iack
        LD      (mystatu.),A
        LD      (hwstatu.),A
        EI
cpwait.
        LD      A,(intcaus.)    ; wait for CP
        AND     04H
        JP      NZ,cpwait.
        RET
```

;
; Transaction 9 - return knob input
;
trans9.
```
        LD      HL,(full.)      ; return 'full'
        LD      (transre.),HL
        DI
        LD      A,(mystatu.)    ; clear knob waiting
        AND     0FDH
        OR      040H            ; set iack
        LD      (mystatu.),A
        LD      (hwstatu.),A
        LD      HL,00H          ; reset 'full'
        LD      (full.),HL
        EI
        JP      cpwait.         ; wait for CP, then return
                                ; see trans8
```

;

; Transaction a - return host message
;
transa.
```
        LD      HL,(hostmes.)       ; send message length
        LD      (transre.),HL
        DI
        LD      A,(mystatu.)        ; clear host msg waiting
        AND     0FBH
        OR      040H                ; set iack
        LD      (mystatu.),A
        LD      (hwstatu.),A
        EI
        LD      A,(hostmes.+1)      ; b = character count
        DEC     A
        RET     Z
        DEC     A
        RET.    Z
        LD      B,A
        LD      HL,hostmes.+2       ; h,l = buffer pointer
        LD      A,(myhands.)        ; c = handshake byte
        LD      C,A
cpack1.
        LD      A,(intcaus.)        ; wait for CP to acknowledge
        AND     010H
        JP      Z,cpack1.
        LD      A,01H               ; clear queue
        LD      (qclear.),A
xferlp.
        LD      E,(HL)              ; transfer the message two bytes
        INC     HL                  ; at a time
        LD      D,(HL)
        INC     HL
        EX      DE,HL
        LD      (transre.),HL
        EX      DE,HL
        LD      A,C                 ; toggle handshake
        CPL
        LD      (myhands.),A
        LD      (hwhands.),A
        LD      C,A
cpack2.
        LD      A,(intcaus.)        ; wait for CP to acknowledge
        AND     010H
        JP      Z,cpack2.
        LD      A,01H               ; clear queue
        LD      (qclear.),A
        DEC     B                   ; decrement character count
        RET     Z
        DEC     B
        JP      NZ,xferlp.
        RET
```

;
; Transaction b - return priority message
;
transb.
```
        LD      A,(ptymess.)        ; return 'ptymess'
        LD      (transre.),A
        DI
        LD      A,(mystatu.)        ; clear priority message
        AND     0F7H
        OR      040H                ; set iack to 1
        LD      (mystatu.),A
        LD      (hwstatu.),A
        EI
        RET
```
; Transaction c - unused
;

```
transc.
        RET

;
; Transaction d - send to leverage
;
transd.
        DI
        LD      A,(mystatu.)    ; set iack to 1
        OR      040H
        LD      (mystatu.),A
        LD      (hwstatu.),A
        EI
        LD      A,(commque.)    ; set leverage
        LD      (leverag.),A
        RET ;
; Transaction e - commport abort
;
transe.
        DI
        LD      A,(mystatu.)    ; set iack to 1
        OR      040H
        LD      (mystatu.),A
        LD      (hwstatu.),A
        EI
        LD      A,(commque.)    ; get the message type
        OR      A
        JP      Z,abrtcmd.      ; jump if abort command
        LD      (rtlflg.),A     ; else, set 'rtlflg' and return
        RET
abrtcmd.
        LD      A,(coutflg.)    ; set 'abortflg' if 'coutflg'
        OR      A               ; is TRUE
        RET     Z
        LD      (abortfl.),A
        RET SECTION B.cpint,CLASS=BSS
myhands.        BYTE    00H
        END
```

KNOB INPUT UTILITY ROUTINE cpxfer/sysknob.c Page 1

```
/***************************************************************
*
*       NAME:   SYSKNOB
*
*
*
*
*
*               Name    Revision
*               SDB     Regular
*               SMD     2nd DC Version
*               SMD     added info pending check
*               SMD     corrected editing error
*               CJB     Removed SCCSid
*
****************************************************************/

/*
* #define       ASCIICODES
```

```
* static      char    SCCSid[] = "@(#)sysknob.c      1.4";
* #undef      ASCIICODES
*/

/*# M-E : CH07/sysknob.c */ include <cpdefs/hwports.h>
include <cpdefs/standardefs.h>
include <iopdefs/status.h> extern  trattention();

define GETKNOB 9          /* transaction number that causes the IOP to */
                           /* send knob data back. */ int
sysknob()
{
        while(HWSTAT & IACK)              /* wait for 'iack' to be zero */
                ;
        if (HWSTAT & KNOBINFO) {
                COMMQ = GETKNOB;          /* return knob displacement */
                trattention();
                return (TRANSREG);
        }
        return(0);                        /* return no movement */
```

FIELD INPUT TRANSLATOR ROUTINE cpinf/knobin.c Page 1

```
/*************************************************************
 *
 * MODULE NAME: KNOBIN           (@(#)knobin.c   1.7)
 *
 *
 *
 *
 *
 *              Name     Revision
 *              ----     --------
 *              SMD      Regular
 *              CJB      Removed SCCSid
 *              SMD      Corrected error display bug
 *              SMD      Change request #85
 *              CJB      Made entry point(s) ROMpack-replaceable
 *              CJB      Added gi_rompack
 *              PJG      Added si_fitype
 *
 *************************************************************/

/*# M-SF,A-E : CH06/knobin */

/********************
             *                  *
             *  INCLUDED FILES  *
             *                  *
             ********************/ include <cpdata/cpstructs.h.c>
include <cpdefs/cpkeycodes.h>
#include <cpdefs/iopcommands.h>
#include <cpdefs/keytones.h>
#include <cpdefs/replace.h>
```

```
/******************
 *                *
 *  LOCAL DEFINES *
 *                *
 ******************/ define ERRCLR          0
define GRPCLASS        0x60
#define NUMCLASS        0x00
#define SELCLASS        0x20

/**********************
 *                    *
 *  EXTERNAL ROUTINES *
 *                    *
 **********************/ extern  errdisp();
extern  gi_mask();
extern  gi_pwr();
extern  gi_refmem();
extern  gi_rompack();
extern  gi_search();
extern  gi_swr();
extern  ni_bcd();
extern  ni_chan();
extern  ni_hex2();
extern  ni_jmpaddr();
extern  ni_mem();
extern  ni_polarity();
extern  ni_rompack();
extern  segcall();
extern  si_16simple();
extern  si_chchoice();
extern  si_directory();
extern  si_dymo();
extern  si_fitype();
extern  si_multilist();
extern  si_rompack();
extern  si_simple();
extern  sysdisplay();
extern  int     sysknob();
extern  systone();

/***********************
 *                     *
 *  EXTERNAL VARIABLES *
 *                     *
 ***********************/

/*# VD : CH12/d.instat : fcurptr */
/*# VD : CH12/d.instat : keycode */
/*# VD : CH12/d.replace : replace */ extern struct fieldcursor    *fcurptr;
extern char                  keycode;
extern struct ramvelement    replace[];

/**********************
 *                    *
 *  MODULE GLOBALS    *
 *                    *
 **********************/ static  char    clrmsg[] = {CLRERR,CLRERRLN};  /* "clearerr" message */
```

```
static    int       (*grpptr[]) () = {
                    gi_mask,
                    gi_pwr,
                    gi_refmem,
                    gi_search,
                    gi_swr,
                    gi_rompack
};

static    int       (*numptr[]) () = {
                    ni_bcd,
                    ni_chan,
                    ni_hex2,
                    ni_jmpaddr,
                    ni_mem,
                    ni_polarity,
                    ni_rompack
};

static    int       (*selptr[]) () = {
                    si_simple,
                    si_16simple,
                    si_multilist,
                    si_dymo,
                    si_chchoice,
                    si_directory,
                    si_rompack,
                    si_fitype
};
/*E*/
                    /***************************
                     *                         *
                     *    CODE BEGINS HERE     *
                     *                         *
                     ***************************/

/*
 * KNOBIN handles field input via the knob for the submode modules.
 *
 * The constants used are:
 *      ERRCLR   - error code to clear 'errdisp' actions
 *      GRPCLASS - field type value for GROUP fields
 *      NUMCLASS - field type value for NUMERIC fields
 *      SELCLASS - field type value for SELECT fields
 */ knobin()
{
register    int    fclass;                                  /* saves ROM */
register    int    ftype;                                   /* saves ROM */
            int    knobcnt;

if (replace[KNOBINDX].smodevector) {
                    /* PACK CONTAINS A REPLACEMENT FOR THIS ROUTINE */
                    segcall(&replace[KNOBINDX]);
                    return;
            } if ((knobcnt = sysknob()) == 0)
                    return;
            ftype = fcurptr->fdescptr->fieldtype;
            fclass = ftype & 0x00E0;
            ftype &= 0x001F;

/* simulate select key */
```

```
            keycode = (knobcnt < 0) ? SLDOWNKEY : SLUPKEY;
            errdisp(ERRCLR,ERRCLR);
            sysdisplay(&clrmsg[0],CLRERRLN);
            systone(SELTONE);

if (fclass == SELCLASS) {
                    (*selptr[ftype]) ();
            } else if (fclass == NUMCLASS) {
                    (*numptr[ftype]) ();
            } else {                                    /* must be a group */
                    (*grpptr[ftype]) ();
            }
            return;
    }
```

*INPUT FIELD HANDLER ROUTINE* cpint/si_simpl.c Page 1

```
/*****************************************************************
 *
 *      MODULE NAME: SI_SIMPLE
 *
 *
 *
 *
 *
 *
 *                        Name       Revision
 *                        ----       --------
 *                        SMD        Regular
 *                        CJB        Removed SCCSid
 *
 *****************************************************************/
/*
 * #define    ASCIICODES
 * static     char    SCCSid[] = "@(#)si_simpl.c      1.2";
 * #undef     ASCIICODES
 */

/*# M-SF,A-E : CH04/si.simple */

/*********************
             *                   *
             *  INCLUDED FILES   *
             *                   *
             *********************/ include <cpdata/cpstructs.h.c>
define SSIMPLE
include <cpdefs/fieldstructs.h>
#include <cpdefs/cpkeycodes.h>

/************************
             *                      *
             *  EXTERNAL ROUTINES   *
             *                      *
             ************************/ extern  linewrite();
extern  schswitch();

/************************
             *                      *
             *  EXTERNAL VARIABLES  *
             *                      *
             ************************/
```

```
/*# VD : CH12/d.instat: fcurptr */
/*# VD : CH12/d.instat: keycode */ extern   struct   fieldcursor      *fcurptr;
extern   char     keycode;
/*E*/
                /****************************
                 *                          *
                 *    CODE BEGINS HERE      *
                 *                          *
                 ****************************/

/*
 * SI_SIMPLE modifies the value of the simple select field pointed
 * to by 'fcurptr'.  It assumes that 'keycode' is a valid input, and
 * 'fcurptr' is pointing to a select field.
 */ si_simple ()
{
register        char      oldvalue;                /* saves old value */
                                        /* pointer to field descriptor */
register        struct ssimple    *fld;

/* modify field value */
        fld = fcurptr->fdescptr;
        oldvalue = *fld->simpval;
        if (keycode == SLDOWNKEY) {
                if (!oldvalue--)
                        oldvalue = fld->simpmax;
        } else {
                if (oldvalue++ == fld->simpmax)
                        oldvalue = 0;
        }
        *fld->simpval = oldvalue;
                                        /* call special case handler */
        if (fld->specid)
                schswitch(fld->specid);
        else                                    /* redisplay line */
                linewrite(fcurptr->curloffset);
        return;
}
/**************************************************************************
 *
 *      MODULE NAME: SO_SIMPLE
 *
 *
 *
 *
 *
 *
 *                      Name      Revision
 *                      ----      --------
 *                      SMD       Regular
 *                      CJB       Removed SCCSid
 *
 **************************************************************************/

/*
 * #define    ASCIICODES
 * static     char    SCCSid[] = "@(#)so_simpl.c      1.2";
 * #undef     ASCIICODES
 */

/*# M-SF,A-E : CH04/so.simple */

/*********************
                 *                  *
```

```
 *      INCLUDED FILES    *
 *                        *
 **************************/ define SSIMPLE
include <cpdefs/fieldstructs.h>
#include <cpdefs/iopcommands.h>

/*************************
          *                       *
          *   EXTERNAL VARIABLES  *
          *                       *
          *************************/

/*# VD : CH12/d.dispbuf: dpbufptr */ extern     char      *dpbufptr;
/*E*/
         /*************************
          *                       *
          *    CODE BEGINS HERE   *
          *                       *
          *************************/

/*
 * SO_SIMPLE constructs a "select" message from the data pointed
 * to by its input parameter.  The message is placed in the area
 * pointed to by 'dpbufptr'.
 */
so_simple (fld)
register       struct ssimple      *fld;
{
register       char    *bufptr;

bufptr = dpbufptr;
    *bufptr++ = SELECT;
    *bufptr++ = SELECTLN;
    *bufptr++ = fld->horzpos;
    *bufptr++ = fld->sheaf;
    *bufptr++ = *fld->simpval;
    *bufptr++ = 0;
    dpbufptr = bufptr;
    return;
}
```

*DISPLAY OUTPUT UTILITY ROUTINE* cpxfer/sysdispl.c Page 1

(DOUR1)

```
/**************************************************************
 *
 *      NAME:    SYSDISPLAY
 *
 *
 *
 *
 *
 *                   Name      Revision
 *                   SMD       Regular
 *                   CJB       Removed SCCSid
 *
 ***************************************************************/
/*
 * #define    ASCIICODES
 * static     char    SCCSid[] = "@(#)sysdispl.c       1.2";
 * #undef     ASCIICODES
 */
```

```
/** M-E : CH07/sysdisplay */

/*****************************************************************/ include <cpdefs/hwports.h>
include <cpdefs/standardefs.h>
include <iopdefs/status.h> extern  blkmovi();
extern  trattention();

/*
 * This module transmits display commands to the IOP.  It does
 * not return until the transmission is complete.
 *
 * The constants used are:
 *      QLEN - length of hardware queue
 */ define QLEN            62

/*****************************************************************/ sysdisplay (bptr, bufsize)
        char    *bptr;
register        int     bufsize;
{
        int     bytecnt;                        /* COMMQ message length */
register        char    *bufptr;                /* input buffer pointer */
        char    *sendptr;               /* pointer to current send block */
        int     mlen;                                   /* command length */ bufptr = bptr;                          /* init buffer pointer */ if (bufsize < QLEN) {           /* buffer can be sent at once */
                sendbuf(bufsize, bufptr);
                return;
        };

mlen = *(bufptr+1);             /* init next message length */
        do {
                sendptr = bufptr;       /* init send block pointer */
                bytecnt = 0;                    /* init byte count */
                do {            /* send as many commands as possible */
                        bytecnt += mlen;
                        bufsize -= mlen;
                        bufptr += mlen;
                } while (((bytecnt + (mlen = *(bufptr+1))) < QLEN)
                        && (bufsize));
                sendbuf(bytecnt, sendptr);
        } while (bufsize);
        return;
}

/*****************************************************************/ static
sendbuf (bytecnt, bufptr)                       /* send buffer to IOP */
        int     bytecnt;                        /* COMMQ message length */
        char    *bufptr;                        /* input buffer pointer */
{
        int     scr;                            /* scratch variable */ while (HWSTAT & IACK)                   /* wait for IOP */
                ;
```

```
tryagain:
        COMMQ = 1;                                      /* move buffer to queue */
        COMMQ = bytecnt + 2;
        blkmovi(bufptr, DATASEGVAL, bytecnt, &COMMQ, DATASEGVAL);
        trattention();                                  /* ask IOP to take it */
        if (HWSTAT & DESTBUSY) {                        /* IOP was busy */
                while (HWSTAT & IACK)                   /* wait for IOP */
                        ;
                scr = 50;                               /* kill time */
                while (scr--)
                        ;
                goto tryagain;                          /* try again */
        };
        return;
}
```

KNOB INPUT TRANSLATOR AND DISPLAY MODIFICATION CALCULATOR ROUTINE cpsub/state.c Page 1

```
/************************************************************************
 *
 *      MODULE NAME: STATE_SUB, I_STATE_SUB       (@(#)state.c    1.27)
 *
 *
 *
 *
 *
 *              Name    Revision
 *              ----    --------
 *              SMD     Regular
 *              SMD     added calls to convcurs
 *              SMD     added i_autotest call
 *              SMD     corrected acqtoref
 *              PJG     Change Request #10
 *              SMD     corrected nsrch (now nhigh)
 *              RLG     zeroed acquisition number sooner
 *              SMD     deleted KRESET
 *              CJB     Removed SCCSid
 *               KM     added softkey verification (ACQTOREF)
 *              SMD     changed repaintcenter
 *              SMD     added kdisp init
 *              SMD     autotest return value change
 *              SMD     corrected movecursor
 *              SMD     added acqmemverify call to hand12
 *              SMD     added search pattern check
 *              SMD     chg request #56, fixed initscroll
 *              SMD     chg request #48
 *              SMD     chg request #52
 *              SMD     corrected dispflgtbl size
 *              CJB     error message if user presses "NEXT HIGHLIGHT" when
 *                         "PATTERNS" selected but pattern application disabled.
 *              CJB     follow-up to 12/22 change: no error if in autorun.
 *                         Incorporate whole function into 'chksearch' subroutin
 *              RLG     nhigh() won't center cursor unless it's moved
 *              RLG     added 'acqmemverify()' call to verify reference
 *                      memory compatability
 *              RLG     signal commpack if in auto-run, changed acqtoref
 ************************************************************************/

/*# M-SF,A-E : CH03/state */

/*********************
                 *                   *
                 *   INCLUDED FILES  *
                 *                   *
                 *********************/
```

```
#include <cpdata/cpstructs.h.c>
#include <cpdefs/classcodes.h>
#include <cpdefs/cpkeycodes.h>
#include <cpdefs/cpmodeindx.h>
#include <cpdefs/preloads.h>
#include <cpdefs/iopcommands.h>
#include <cpdefs/standardefs.h>
#include <cpdefs/evcod.h>
```

```
/*******************
 *                 *
 *  LOCAL DEFINES  *
 *                 *
 *******************/
```

```
#define _75MSEC     4210
#define ACQINCR     3
#define ACQTOREF    2
#define BOUND       4
#define DALWAYS     0
#define DNOTAUTO    1
#define DC1ACT      2
#define DC2ACT      3
#define DARET       4
#define DCVAL       5
#define DGLT        6
#define DCARD0      7
#define DCARD1      8
#define DCARD2      9
#define DCARD3      10
#define DACQDISP    11
#define DISABMSG    62
#define DREFDISP    12
#define FIRSTLINE   11
#define GLITCHES    3
#define HIGHPOS     12
#define HIGHSIZE    512
#define LINERAST    8
#define L2F4        17
#define L7F2        6
#define MEMDIF      1
#define MINUSMOVE   -12
#define MODECHG     2
#define NEWACQ      2
#define NONE        0
#define PATHIGH     2
#define PLUSMOVE    12
#define REPAINT     1
#define SCRLLEVER   0x02
#define SCRLRATE    1
#define SCRLSIZE    15
#define SETOACQ     0
#define SETOREF     1
#define UNUSED      2
#define UNVERIFIED  1
#define VERIFIED    0
#define VERMSG      18
```

```
/*****************
 *               *
 *    MACROS     *
 *               *
 *****************/
```

```
/*
 * PORTSEND    Send data at msgptr to syscomout.
 */
```

```
#define PORTSEND(msgptr)         while ( !syscomout(msgptr) ) wait()
```

```
/***********************
 *                     *
 *  EXTERNAL ROUTINES  *
 *                     *
 ***********************/ extern  int     acqmemverify();
extern          applycompare();
extern  char    autotest();
extern          blkmovi();
extern          chgclass();
extern          chgdispmem();
extern          convcurs();
extern  char    cursormove();
extern          errdisp();
extern          fieldin();
extern          fillcp();
extern          genstate();
extern          i_autotest();
extern          linewrite();
extern          newchanptrs();
extern          newcursor();
extern          nextglitch();
extern          nexthighlight();
extern          setauto();
extern          setdcursor();
extern          setleverage();
extern  int     stepcursor();
extern          sysdisplay();
extern  char    sysin();
extern  int     sysknob();

/***********************
             *                     *
             *  EXTERNAL VARIABLES *
             *                     *
             ***********************/

/*# VD : CH12/d.highlight : acqcompare */
/*# VD : CH12/d.acqmem : acqmem */
/*# VD : CH12/d.instat : acqnum */
/*# VD : CH12/d.highlight : acqsearch */
/*# VD : CH12/d.datacursorpo : actflg */
/*# VD : CH12/d.instat : autoflag */
/*# VD : CH12/d.instat : cardtypes */
/*# VD : CH12/d.chanptrs : chnlptrs */
/*# VD : CH12/d.instat : commtyp */
/*# VD : CH12/d.ftglobals : ctxt */
/*# VD : CH12/d.instat : curdflgtbl */
/*# VD : CH12/d.instat : curlarray */
/*# VD : CH12/d.instat : curmem */
/*# VD : CH12/d.datacursorpo : cur1 */
/*# VD : CH12/d.datacursorpo : cur1bcd */
/*# VD : CH12/d.datacursorpo : cur2 */
/*# VD : CH12/d.datacursorpo : cur2bcd */
/*# VD : CH12/d.instat : dispacqnum */
/*# VD : CH12/d.dispbuf : dispbuf */
/*# VD : CH12/d.dispbuf : dpbufptr */
/*# VD : CH12/d.instat : fcurptr */
/*# VD : CH12/d.dispselects : gdisp */
/*# VD : CH12/d.gsdataparms : gldisplay */
/*# VD : CH12/d.setup : glitches */
/*# VD : CH12/d.dispselects : highlight */
/*# VD : CH12/d.highlight : refcompare */
/*# VD : CH12/d.refmem : refmem */
/*# VD : CH12/d.highlight : refsearch */
```

```
/*# VD : CH12/d.searchpat : s_enable */
/*# VD : CH12/d.setup : threshold */
/*# VD : CH12/d.instat : verflg */ extern  char    acqcompare[];
extern  struct  memstructure    acqmem;
extern  char    acqnum[];
extern  char    acqsearch[];
extern  char    actflg;
extern  char    autoflag;
extern  char    cardtypes[];
extern  char    *chnlptrs[];
extern  char    commtyp;
extern  char    ctxt[];
extern  char    *curdflgtbl;
extern  struct  larraystructure *curlarray;
extern  struct  memstructure    *curmem;
extern  int     cur1;
extern  char    cur1bcd[];
extern  int     cur2;
extern  char    cur2bcd[];
extern  char    dispacqnum;
extern  char    dispbuf[];
extern  char    *dpbufptr;
extern  struct  fieldcursor     *fcurptr;
extern  char    gdisp;
extern  char    gldisplay;
extern  char    glitches;
extern  char    highlight;
extern  char    refcompare[];
extern  struct  memstructure    refmem;
extern  char    refsearch[];
extern  char    s_enable;
extern  int     threshold[];
extern  char    verflg;

/***********************
             *                     *
             *   MODULE GLOBALS   .*
             *                     *
             ***********************/ static  struct  fieldcursor     fcursor;            /* field cursor */
static  int     kdisp;              /* remaining knob displacement */
static  int     rastersleft;        /* rasters left in scroll buffer */
static  int     scrollpos;   /* memory location displayed on line 11 */
static  int     scrolltop;   /* TRUE if scrolling onto top of display */
                                            /* "scroll wait" command */
static  char    scrwait[] = {SCRWAT, SCRWATLN};
                                    /* a command string for syscomout() */
static  char    statcmd[] = {STATUS, STATUSLN, N_AUTO};
static  char    unblnk[] = {UNBLNK, UNBLNKLN};  /* "unblink" command */
/*E*/
            /****************************
             *                          *
             *    CODE BEGINS HERE      *
             *                          *
             ****************************/

/*
 * STATE_SUB is the state submode.
 *
 * The constants used are:
 *      _75MSEC - used to waste about 75 msec
 *      ACQINCR - autotest return value for 'acqnum' increment
 *      ACQTOREF - acqmemverify parm for refmem to acqmem compare
 *      BOUND - number of lines in the scroll boundary
 *      DALWAYS - display flag for always displayed
```

```
*       DNOTAUTO - display flag for not in auto mode
*       DC1ACT - display flag for cursor 1 active
*       DC2ACT - display flag for cursor 2 active
*       DARET - display flag for acquisition number
*       DCVAL - display flag for counter value valid
*       DGLT - display flag for glitches stored
*       DCARD0 - display flag for card 0 in auto-run
*       DCARD1 - display flag for card 1 in auto-run
*       DCARD2 - display flag for card 2 in auto-run
*       DCARD3 - display flag for card 3 in auto-run
*       DACQDISP - display flag for acqmem as active memory
*       DISABMSG - number of "PATTERN SEARCH DISABLED" message.
*       DREFDISP - display flag for refmem as active memory
*       FIRSTLINE - first line of scrolling area
*       GLITCHES - 'highlight' value when highlight glitches selected
*       HIGHPOS - the horizontal position of the highlight select field
*       HIGHSIZE - the number of bytes in a highlight channel
*       LINERAST - number of rasters in a line
*       L2F4 - number of bytes between the first field on line 2
*              and the first byte of field descriptor 4
*       L7F2 - number of bytes between the first field on line 7
*              and the first byte of field descriptor 2
*       MEMDIF - 'highlight' value for memory differences
*       MINUSMOVE - lower knob displacement bound for cursor movement
*       MODECHG - the value returned by verify() when a mode change to
*                 remote was received during soft key verification
*       NEWACQ - autotest return value for new acquisition made
*       NONE - 'highlight' value for no highlighting
*       PATHIGH - 'highlight' value for pattern occurrences
*       PLUSMOVE - upper knob displacement bound for cursor movement
*       REPAINT - autotest return value for screen repaint
*       SCRLLEVER - knob leverage for scrolling
*       SCRLRATE - scrolling rate (rasters/tick)
*       SCRLSIZE - number of lines in scrolling area
*       SETOACQ - acqmemverify parm for setup to acqmem compare
*       SETOREF - acqmemverify parm for setup to refmem compare
*       UNUSED - 'ctrunits' value for unused
*       UNVERIFIED - the value returned from verify() when the soft
*                    key operation has not been verified
*       VERIFIED - the value returned from verify() when the soft
*                  key operation has been verified
*       VERMSG - the error message number of the verification message
*/

/****************************************************************/ i_state_sub()
{
register        char    *ptr;                   /* scratch pointer */ fcursor.curloffset = 6;                 /* init field cursor */
                                                /* highlight select */
        ptr = curlarray[fcursor.curloffset].firstfield;
        ptr += L7F2;
        fcursor.fdescptr = ptr;
        fcursor.oldhorz = 12;
        return;
}

/****************************************************************/ state_sub()
{
        int     actval;                         /* autotest return value */
        int     badflg;                         /* TRUE if memory config bad */
register        char    *cptr;                  /* saves ROM */
```

```
        register     int       ctr;                              /* loop counter */
                char      dispflgtbl[14];
                int       key;
                int       verparm;                       /* acqmemverify parm */
                int       verval;                        /* verify() return value */ fcurptr = &fcursor;
                curdflgtbl = &dispflgtbl[0];

if (autoflag) {                                  /* set censorclass */
                        chgclass(NONECLASS);
                        ctr = 5;                                 /* zero acquisition count */
                        cptr = &acqnum[0];
                        while (ctr--)
                                *cptr++ = 0;
                        if (commtyp)
                                PORTSEND(&statcmd[0]);
                i_autotest();
        } else
                chgclass(STECLASS);
                                                                 /* set display flags */
        cptr = &dispflgtbl[0];
        *cptr++ = TRUE;                                          /* DALWAYS */
        *cptr++ = !autoflag;                                     /* DNOTAUTO */
        *cptr++ = actflg;                                        /* DC1ACT */
        *cptr++ = !actflg;                                       /* DC2ACT */
        *cptr++ = dispacqnum;                                    /* DARET */
        *cptr++ = curmem->ctrunits != UNUSED;                    /* DCVAL */
        *cptr++ = curmem->glstored;                              /* DGLT */
        *cptr++ = autoflag;                                      /* DCARD0 */
        *cptr++ = cardtypes[1] && autoflag;                      /* DCARD1 */
        *cptr++ = cardtypes[2] && autoflag;                      /* DCARD2 */
        *cptr++ = cardtypes[3] && autoflag;                      /* DCARD3 */
        *cptr++ = (curmem == &acqmem);                           /* DACQDISP */
        *cptr  = (curmem == &refmem);                            /* DREFDISP */

/* verify cursor position */
        if (!dispflgtbl[fcursor.fdescptr->dflgoff]) {
                                                                 /* field disappeared */
                if (autoflag) {
                        fcursor.curloffset = 1;
                        ctr = L2F4;                              /* card 0 select */
                        fcursor.oldhorz = 10;
                } else {
                        fcursor.curloffset = 6;
                        ctr = L7F2;                              /* highlight select */
                        fcursor.oldhorz = 12;
                }
                cptr = curlarray[fcursor.curloffset].firstfield;
                cptr += ctr;
                fcursor.fdescptr = cptr;
        } copyctrtext();
        convcurs(TRUE);
                                                                 /* initialize display */
        dpbufptr = dispbuf;
        *dpbufptr++ = PRELOD;
        *dpbufptr++ = PRELODLN;
        *dpbufptr++ = (autoflag) ? NOKEYS : STATKEYS;
        ctr = 9;
        while (ctr--)
                linewrite(9-ctr);
                                                                 /* make sure memory can be displayed */
        verparm = (curmem == &acqmem) ? SETOACQ : SETOREF;
        if (dispacqnum)
                acqmemverify(SETOREF, TRUE);
```

```
if (!acqmemverify(verparm, TRUE))           /* memory config is bad */
        if (badmem())                                /* mode change */
                return;

newcursor();                                       /* finish display */
rastersleft = 0;
initscroll();
repaintcenter();
                                       /* check for highlighting problems */
if (highlight == MEMDIF)
        acqmemverify(ACQTOREF, TRUE);
else
        chksearch();

setleverage(SCRLLEVER);                             /* init knob */
sysknob();
kdisp = 0;                                 /* reset knob displacement */

/***********************
 *    MAIN LOOP        *
 ***********************/ for (;;) {
        if ((key = autotest(&actval)) == MODEKEY)
                return;

if (actval == REPAINT) {
                mchgdisp();
                repaintcenter();
        } else if (actval == NEWACQ) {
                dpbufptr = &dispbuf[0];
                linewrite(2);
        } if (key != NOKEY) {
                badflg = FALSE;         /* memory config is good */
                switch (key) {
                case ATORKEY:   verval = verify();
                                if (verval == MODECHG)
                                        return;
                                else if (verval == VERIFIED)
                                        badflg = acqtoref();
                                break;
                case DSPRAKEY:  badflg = dispacqref();
                                break;
                case NHIGHKEY:  nhigh();
                                break;
                case CHACTKEY:  chgact();
                                break;
                default:        cursormove(key, TRUE);
                                fieldin();
                }
                                                /* unblink softkey */
                if ((key & 0xFF) >= DELSTPKEY)
                        sysdisplay(&unblnk[0], UNBLNKLN);

if (badflg)     /* memory config is now bad */
                        if (badmem())
                                return;
        }
        scroll();                               /* scroll the display */
        }
}
/*E*/
                /*****************************
                 *                           *
                 *    LOCAL SUBROUTINES      *
```

```
                              *                           *
                              ****************************/

/*
 * LOCAL SUBROUTINE INDEX
 *
 *      acqtoref()
 *              ACQMEM TO REFMEM softkey handler, returns TRUE if
 *              the active memory config no longer matches the setup
 *      actline()
 *              returns the line number of the active cursor
 *      badmem()
 *              handles operations required when the active memory
 *              config does not match the setup.  Returns TRUE
 *              if a mode change is required.  Returns FALSE if
 *              the condition is corrected by a softkey input.  It
 *              is used to avoid recursive softkey handlers.  See
 *              the internal spec for a detailed description.
 *      blkpaint(first line, memory location, line number)
 *              generates 'line number' lines in the scrolling area,
 *              starting at 'first line' with data starting at 'memory
 *              location'.  The maximum value admissible for 'line
 *              number' is dependent on the size of descripq.  This
 *              routine has the important side effect of setting
 *              gldisplay.
 *      boundary()
 *              returns TRUE if the active cursor is within a
 *              scroll boundary area (it need not be on the display)
 *      chgact()
 *              CHANGE ACTIVE CURSOR softkey handler
 *      chksearch()
 *              Display "SEARCH PATTERN DISABLED" error message if not
 *              in autorun AND pattern highlighting is currently selected
 *              AND pattern application was disabled in search submode.
 *              Return TRUE iff error displayed.
 *      copyctrtext()
 *              copies curmem->ctrtext to ctxt, so that it may be
 *              referenced by the field table
 *      dispacqref()
 *              DISPLAY ACQMEM/REFMEM softkey handler, returns TRUE
 *              if the active memory config no longer matches the setup
 *      hand11()
 *              special case handler for auto-run selects
 *      hand12()
 *              special case handler for highlight and glitch
 *              display selects
 *      initscroll()
 *              initializes scrollpos, scrolltop if necessary
 *      mchgdisp()
 *              handles display modification on lines 2-7 when the
 *              active memory changes
 *      movecursor()
 *              moves the active cursor 1 line in the direction
 *              indicated by kdisp.
 *      newscroll()
 *              initializes the scroll buffer in the direction
 *              indicated by kdisp
 *      nhigh()
 *              NEXT HIGHLIGHT OCCURRENCE softkey handler
 *      partialscroll(rastnum, rastrate)
 *              scrolls rastnum rasters in the direction indicated
 *              by scrolltop at rastrate pixels/tick, modifying
 *              rastersleft accordingly.  If necessary, scrollpos
 *              is modified also.
 *      repaintcenter()
 *              handles the generation of lines 11-25 of the display
 *      scroll()
 *              handles scrolling the display
```

```
 *      verify()
 *              handles soft key verification
 *      wait()
 *              diddle for about 75 msec
 */

/*******************************************************************/ static
acqtoref()                              /* ACQMEM TO REFMEM softkey handler */
{
                                        /* sets up scrolling area blanking */
static  char    clrcenter[] = {SCRWAT, SCRWATLN, CLRLNB, CLRLNLN};

int     i;                              /* loop counter */

/* move memory */
        blkmovi(&acqmem, DATASEGVAL, sizeof(acqmem), &refmem, DATASEGVAL);
                                                /* change highlight data */
        blkmovi(&acqsearch, DATASEGVAL, HIGHSIZE, &refsearch, DATASEGVAL);
        fillcp(&acqcompare, DATASEGVAL, HIGHSIZE, 0);
        blkmovi(&acqcompare, DATASEGVAL, HIGHSIZE, &refcompare, DATASEGVAL);

if (curmem == &acqmem) {                /* acqmem being displayed */
                if ((highlight == MEMDIF) &&
                    acqmemverify(SETOACQ, FALSE))
                        repaintcenter();
                return(!acqmemverify(SETOACQ, TRUE));
        } newchanptrs(&refmem, &chnlptrs[0]);  /* refmem being displayed */
        mchgdisp();
        if (acqmemverify(SETOREF, TRUE)) {
                repaintcenter();
                return(FALSE);
        }
                                                /* blank scrolling area */
        sysdisplay(&clrcenter[0], sizeof(clrcenter));
        dispbuf[0] = SHPSCR;
        dispbuf[1] = SHPSCRLN;
        dispbuf[2] = 31;
        dispbuf[3] = 0;
        dispbuf[4] = 64;
        for (i = 11; i < 26; i++) {
                sysdisplay(&dispbuf[0], SHPSCRLN);
                dispbuf[2] = i;
        }
        return(TRUE);
}

/*******************************************************************/ static  int
actline()                               /* find line number of active cursor */
{
register        int     retval;         /* used to calculate returned value */ retval = ((actflg) ? cur1 : cur2) - scrollpos;
        return(retval + FIRSTLINE);
}

/*******************************************************************/ static  int
badmem()                                /* handles memories with bad configs */
{
register        int     key;
register        int     verparm;                /* acqmemverify parm */
int                     verval;                 /* verify() return value */
```

```
        for (;;) {                             /* loop until display possible */
                if ((key = sysin()) == NOKEY)
                        continue;
                switch (key) {
                case MODEKEY:   return (TRUE);
                case ATORKEY:   verval = verify();
                                if (verval == MODECHG)
                                        return(TRUE);
                                else if (verval == VERIFIED)
                                        if (!acqtoref()) {
                                                sysdisplay(&unblnk[0], UNBLNKLN
                                                return(FALSE);
                                        }
                                break;
                case DSPRAKEY:  if (!dispacqref()) {
                                        sysdisplay(&unblnk[0], UNBLNKLN);
                                        return(FALSE);
                                }
                                break;
                                                /* redisplay message */
                default:        verparm = (curmem == &acqmem) ?
                                                SETOACQ : SETOREF;
                                acqmemverify(verparm, TRUE);
                }
                if ((key & 0xFF) >= DELSTPKEY)  /* unblink softkey */
                        sysdisplay(&unblnk[0], UNBLNKLN);
        }
}

/*******************************************************************/ static
blkpaint(startline, startloc, linenum)
                                /* generate lines in the scroll area */
        int     startline;                      /* first line generated */
register        int     startloc;               /* location counter */
register        int     linenum;                /* loop/line counter */
{
        int     high;                           /* highlight value */ high = (autoflag) ? NONE : highlight;   /* set up loop */
        dpbufptr = &dispbuf[0];
                                                /* important side effect */
        gldisplay = gdisp && curmem->glstored;
        while (linenum--) {
                genstate(startloc++, high);
                *dpbufptr++ = SHPSCR;            /* add shipscreen command */
                *dpbufptr++ = SHPSCRLN;
                *dpbufptr++ = startline++;
                *dpbufptr++ = 0;
                *dpbufptr++ = 64;
        }
        sysdisplay(&dispbuf[0], (dpbufptr - &dispbuf[0]));
        return;
}

/*******************************************************************/ static int
boundary()      /* detemine if active cursor is within boundary area */
{
register        int     line;           /* line number of active cursor */ line = actline();
        if (((line <= (FIRSTLINE + BOUND - 1)) && (kdisp < 0)) ||
            ((line >= (FIRSTLINE + SCRLSIZE - BOUND + 1)) && (kdisp > 0)))
                return(TRUE);
        return(FALSE);
```

```c
}

/****************************************************************/ static
chgact()                           /* CHANGE ACTIVE CURSOR softkey handler */
{
register      int       acur;                      /* scratch integer */
register      char      *ptr;                      /* scratch pointer */
        actflg = !actflg;
        ptr = curdflgtbl + DC1ACT;                 /* modify display flags */
        *ptr++ = !*ptr;
        *ptr = !*ptr;
        dpbufptr = &dispbuf[0];
        linewrite(2);
        linewrite(3);

acur = (actflg) ? cur1 : cur2;
        if (cur1 == cur2) {                        /* repaint cursor line */
                                                   /* wait for scrolling */
                sysdisplay(&scrwait[0], SCRWATLN);
                blkpaint(actline(), acur, 1);
        }
                        /* repaint iff new cursor is out of bounds */
        if ((acur < (scrollpos + BOUND - 1)) ||
           ((acur > (scrollpos + SCRLSIZE - BOUND)))) {
                initscroll();
                repaintcenter();
        }
        return;
}

/****************************************************************/ static
chksearch()             /* Display "SEARCH PATTERN DISABLED" if appropriate.*/
                        /* Return TRUE if it is, FALSE otherwise. */
{
        if ((highlight == PATHIGH)
        && !s_enable
        && !autoflag) {
                errdisp(DISABMSG, 0);
                return(TRUE);
        } return(FALSE);
}

/****************************************************************/ static
copyctrtext()                              /* copies curmem->ctrtext to ctxt */
{
register      char*     fptr;                      /* scratch pointers */
register      char*     tptr;

if (curmem->ctrunits != UNUSED) {
                                /* there is something to copy */
                fptr = &curmem->ctrtext[0];
                tptr = &ctxt[0];
                while ((*tptr++ = *fptr++) != STRGEND)
                        ;
        }
        return;
}
/****************************************************************/ static  int
```

```
dispacqref()                    /* DISPLAY ACQMEM/REFMEM softkey handler */
{
register        int     verparm;                /* acqmemverify parm */
        char    tempflg;                        /* temporary display flag */ verparm = (curmem == &acqmem) ? SETOREF : SETOACQ;
        if (!acqmemverify(verparm, TRUE)) {     /* invalid memory config */
                verparm = (curmem == &acqmem) ? SETOACQ : SETOREF;
                return(!acqmemverify(verparm, FALSE));
        }
        chgdispmem(TRUE);
        tempflg = curdflgtbl[DACQDISP];
        curdflgtbl[DACQDISP] = curdflgtbl[DREFDISP];
        curdflgtbl[DREFDISP] = tempflg;
        mchgdisp();
        repaintcenter();
        return(FALSE);
}

/*********************************************************************/ hand11()                /* special case handler for auto-run selects */
{
        setauto();
        dpbufptr = &dispbuf[0];
        linewrite(fcurptr->curloffset);
        return;
}

/*********************************************************************/ hand12()        /* special case handler for highlight and glitch selects */
{
        if (fcursor.fdescptr->horpos == HIGHPOS) {
                if (highlight == MEMDIF)
                        acqmemverify(ACQTOREF, TRUE);
                else
                        chksearch();
        }
        dpbufptr = &dispbuf[0];
        linewrite(6);
        repaintcenter();
        return;
}

/*********************************************************************/ static
initscroll()    /* initialize scrollpos by centering the active cursor */
{
        scrollpos = (actflg) ? cur1 : cur2;
        scrollpos -= SCRLSIZE/2;
        if (rastersleft == LINERAST)
                scrolltop = FALSE;
        return;
}

/*********************************************************************/ static
mchgdisp()              /* modify display after active memory change */
{
register        char    *ptr;                   /* scratch pointer */ copyctrtext();
        convcurs(TRUE);
                                        /* redo display flags and display */
```

```
             *(curdflgtbl+DCVAL) = curmem->ctrunits != UNUSED;
             *(curdflgtbl+DGLT) = curmem->glstored;
                            /* correct field cursor if field disappeared */
             if (!*(curdflgtbl+(fcursor.fdescptr->dflgoff))) {
                                                        /* highlight select */
                    ptr = curlarray[fcursor.curloffset].firstfield;
                    ptr += L7F2;
                    fcursor.fdescptr = ptr;
                    fcursor.oldhorz = 12;
                    newcursor();
             }
             dpbufptr = &dispbuf[0];
             linewrite(2);                              /* finish display */
             linewrite(3);
             linewrite(4);
             linewrite(5);
             linewrite(6);
             return;
}

/*********************************************************************/ static
movecursor()                                            /* moves cursor 1 line */
{
register        char      *bufptr;                      /* saves ROM*/ if (stepcursor(kdisp < 0)) {               /* teleport */
                    initscroll();                       /* reset scroll position */
                    scrollpos += (kdisp < 0) ? -(BOUND+1) : (BOUND+1);
                    repaintcenter();
             } else {                                   /* move cursor */
                    bufptr = &dispbuf[0];
                    *bufptr++ = SCRWAT;
                    *bufptr++ = SCRWATLN;
                    *bufptr++ = MVSTCR;
                    *bufptr++ = MVSTCRLN;
                    *bufptr++ = !actflg;
                    *bufptr = actline();
                    sysdisplay(&dispbuf[0], (SCRWATLN+MVSTCRLN));
             }
             setdcursor();
             return;
}

/*********************************************************************/ static
newscroll()                                             /* does scroll buffer initialization */
{
register        char      *bufptr;                      /* saves ROM */
        int       high;                                 /* highlight type */
register        int       locnum;                       /* memory location */ high = (autoflag) ? NONE : highlight;
             scrolltop = (kdisp < 0);
             locnum = (scrolltop) ? scrollpos - 1 : scrollpos + SCRLSIZE;
             dpbufptr = &dispbuf[0];
             genstate(locnum, high);                    /* blkpaint set gldisplay */
             bufptr = dpbufptr;
             *bufptr++ = (scrolltop) ? TXTSCT : TXTSCB;
             *bufptr++ = TXTSCLN;
             *bufptr++ = 0;
             *bufptr++ = SCRLRATE;
             *bufptr++ = TRUE;
             sysdisplay(&dispbuf[0], (bufptr - &dispbuf[0]));
             rastersleft = LINERAST;
             return;
```

```c
}
/***************************************************************/ static
nhigh()                         /* NEXT HIGHLIGHT OCCURRENCE softkey handler */
{
        if (chksearch())
                return;
        else if ( highlight == NONE )
        {
                errdisp(65,0);          /* tell user highlighting is off */
                return;
        }
        else if ( highlight == GLITCHES )
        {
                if ( !nextglitch())
                        return;         /* any warning mesg. already done */
        }
        else
                if ( !nexthighlight())
                        return;         /* any warning mesg. already done */ setdcursor();
        initscroll();                                           /* repaint */
        repaintcenter();
        return;
}
/***************************************************************/ static
partialscroll(rastnum, rastrate)                /* does partial line scroll */
        int     rastnum;                        /* rasters to scroll */
        int     rastrate;                       /* rate to scroll */
{
register        char    *bufptr;                        /* saves ROM */ bufptr = &dispbuf[0];                   /* send command to IOP */
        *bufptr++ = (scrolltop) ? SCLT : SCLB;
        *bufptr++ = SCLN;
        *bufptr++ = rastnum;
        *bufptr++ = rastrate;
        *bufptr = TRUE;
        sysdisplay(&dispbuf[0], SCLN);

if (scrolltop && (rastersleft == LINERAST))     /* new top line */
                --scrollpos;

rastersleft -= rastnum;

if (!scrolltop && !rastersleft)         /* bottom line complete */
                ++scrollpos;
        return;
}

/***************************************************************/ static
repaintcenter()                 /* generate lines 11-25 of the display */
{
        sysdisplay(&scrwait[0], SCRWATLN);      /* wait for scrolling */
        blkpaint(11, scrollpos, 3);             /* first 3 lines */
        blkpaint(14, (scrollpos+3), 4);         /* next 4 lines */
        blkpaint(18, (scrollpos+7), 4);         /* next 4 lines */
        blkpaint(22, (scrollpos+11), 4);        /* last 4 lines */ if (rastersleft)                        /* preload the scroll buffer */
                blkpaint(31, (scrollpos + SCRLSIZE), 1);
        return;
```

```
}

/********************************************************************/
static
scroll()                                    /* handles scrolling the display */
{
register    int     abskdisp;               /* absolute value of kdisp */ if (!(kdisp += sysknob()))                      /* no movement */
                return;

if (boundary()) {                               /* do scrolling */
                                        /* init scroll buffer if necessary */
                if (rastersleft == 0)
                        newscroll();

/* check for a direction change, correct bookkeeping if necessary */
                if (((kdisp > 0) && scrolltop) ||
                    ((kdisp < 0) && !scrolltop)) {      /* new direction */
                        rastersleft = LINERAST - rastersleft;
                        scrolltop = !scrolltop;
                                        /* init scroll buffer if necessary */
                        if (rastersleft == 0)
                                newscroll();
                } if ((abskdisp = kdisp) < 0)             /* use abs of kdisp */
                        abskdisp = -kdisp;

if (abskdisp < rastersleft) {   /* scroll partial line */
                        partialscroll(abskdisp, SCRLRATE);
                } else {                                /* scroll over line */
                                        /* scroll remainder of buffer */
                        partialscroll(rastersleft, 0);
                                                /* move the data cursor */
                        movecursor();
                        newscroll();                    /* reload buffer */
                }
        } else {                        /* move cursor without scrolling */
                if ((kdisp > MINUSMOVE) && (kdisp < PLUSMOVE))
                        return;                 /* knob wasn't moved enough */
                movecursor();
        } kdisp = 0;                              /* reset knob displacement */
        return;
}

/********************************************************************/
/*
 * verify() does the soft key verification necessary
 * for handling the ACGMEM TO REFMEM soft key.
 * This routine returns one of three possible values:
 *
 *      0 - soft key verified
 *      1 - soft key unverified (ignore it)
 *      2 - mode change
 */ static
verify()
{
        char    keycode;                /* value returned by sysin() */
        /*
         * First we display the verification message
         * using errdisp() and then going into a
         * tight loop waiting for something other than
```

```
 *      "NO KEY" to be returned by sysin().
 *
 *      The global 'verflg' is set to TRUE before calling
 *      sysin() so that sysin() will know that we are in
 *      a softkey verification mode.
 *
 *      If sysin() returns a mode change to Remote, we
 *      must honor the mode change so we return MODECHG
 *      to the calling routine (when 'verflg' is TRUE,
 *      sysin() will only return MODEKEY if the mode
 *      change is to Remote).
 *
 *      If sysin() returns the "X" key, the user has
 *      verified that he does want to clear ther trigger
 *      condition so we return VERIFIED.
 *
 *      If sysin() returns anything else, the action is
 *      not verified and this causes a return to the
 *      calling routine with a value of UNVERIFIED.
 */ errdisp(VERMSG, 0);
        verflg = TRUE;
        while ((keycode = sysin()) == NOKEY);
        verflg = FALSE;

if (keycode == MODEKEY)
                return(MODECHG);
        else if (keycode == XKEY)
                return(VERIFIED);
        else
                return(UNVERIFIED);
}
static
wait()
{
        int i;

for ( i = 0; i < _75MSEC; i++)
                continue;
}
;****************************************************************
; *
; *    NAME:    DISPLATCHER     (@(#)displatc.z80 1.3)
; *
; *
; *
; *
; *                     Name       Revision
; *                     SMD        assembler version
; *                     CJB        Removed SCCS id ('what' string)
; *
;****************************************************************
;
; # M-E : CH09/displatcher
        NAME    displatc
        GLOBAL  displat.
        GLOBAL  i_displ.

; # VD : CH13/d.descripq : descripq
; # VD : CH13/d.descripq : dqinptr
; # VD : CH13/d.descripq : dqoutptr
; # VD : CH13/d.dispdata : scrollflag
; # VD : CH13/d.textscroll : flag
; # VD : CH13/d.tscrcommand : tscrflag ;
;extern char    descripq[];
;extern char    *dqinptr;
```

```
;extern char    *dqoutptr;
;extern char    flag;
;extern char    scrollflag;
;extern char    tscrflag;
;
;extern char    clearerr();              /* display command handlers */
;extern char    clearline();
;extern char    dataload();
;extern char    fcurpos();
;extern char    glitchgen();
;extern char    groupdisp();
;extern char    grpload();
;extern char    indtext();
;extern char    ingrpnames();
;extern char    litertext();
;extern char    movstcur();
;extern char    movtmgcur();
;extern char    numeric();
;extern char    outgrpnames();
;extern char    preload();
;extern char    scrdir();
;extern char    select();
;extern char    sheafref();
;extern char    shiperr();
;extern char    shipscreen();
;extern char    statecur();
;extern char    statprog();
;extern char    tmginfo();
;extern char    tmgscroll();
;extern char    traceload();
;extern char    traceoff();
;extern char    txtscrl();
;extern char    unblink();
;extern char    updatetmg();
;extern char    varkeyload();
;
        GLOBAL  scrollw.
        GLOBAL  scrtxtw.
        GLOBAL  scrtmgw.
        GLOBAL  varkeyl.
        GLOBAL  updatet.
        GLOBAL  unblink.
        GLOBAL  txtscrl.
        GLOBAL  traceof.
        GLOBAL  tracelo.
        GLOBAL  tmgscro.
        GLOBAL  tmginfo.
        GLOBAL  statpro.
        GLOBAL  statecu.
        GLOBAL  shipscr.
        GLOBAL  shiperr.
        GLOBAL  sheafre.
        GLOBAL  select.
        GLOBAL  scrdir.
        GLOBAL  preload.
        GLOBAL  outgrpn.
        GLOBAL  numeric.
        GLOBAL  movtmgc.
        GLOBAL  movstcu.
        GLOBAL  literte.
        GLOBAL  ingrpna.
        GLOBAL  indtext.
        GLOBAL  grpload.
        GLOBAL  groupdi.
        GLOBAL  glitchg.
        GLOBAL  fcurpos.
        GLOBAL  dataloa.
        GLOBAL  clearli.
```

```
            GLOBAL    clearer.
            GLOBAL    tscrfla.
            GLOBAL    scrollf.
            GLOBAL    flag.
            GLOBAL    dqoutpt.
            GLOBAL    dqinptr.
            GLOBAL    descrip.

;
;/*
; * This routine is the control routine for the display
; * handlers.  It's purpose in life is to determine which
; * display handler should take care of the next command
; * in 'descripq'.  Two bookkeeping functions are also
; * done.  The first is management of the 'descripq' pointers.
; * The second is determination of when handling of the
; * display has taken enough time, and the other background
; * tasks should be given a chance.
; *
; * The constants used are:
; *     MAXWEIGHT - maximum weight of handlers that can be
; *                 run in one invocation.
; *     WRAPCDE - indicates wrap around to beginning of 'descripq'
; */
;

MAXWEIGHT       EQU       OFH
WRAPCDE         EQU       OFFH

;
;        char     scrtmgwait();                /* bookkeeping routines */
;        char     scrtxtwait();
;        char     scrollwait();
;
;        DATA                                  /* initialized variable section */
;
;static char      (*subrtbl []) () = {    /* ptrs to display handlers, */
;/*  0 */         clearline,              /* index by command code    */
;                 clearline,
;                 clearline,
;                 groupdisp,
;                 indtext,
;/*  5 */         ingrpnames,
;                 litertext,
;                 numeric,
;                 numeric,
;                 numeric,
;/*  A */         outgrpnames,
;                 scrtxtwait,
;                 scrtxtwait,
;                 select,
;                 sheafref,
;/*  F */         shiperr,
;                 shipscreen,
;                 statecur,
;                 statecur,
;                 grpload,
;/* 14 */         indtext,
;                 traceoff,
;                 clearerr,
;                 varkeyload,
;                 fcurpos,
;/* 19 */         glitchgen,
;                 movstcur,
;                 movtmgcur,
;                 preload,
;                 scrollwait,
;/* 1E */         tmginfo,
;                 scrtmgwait,
;                 traceload,
```

```
;                       statprog,
;                       unblink,
;/* 23 */               updatetmg,
;                       dataload,
;                       grpload,
;                       scrdir,
;                       scrdir,
;/* 28 */               varkeyload,
;                       preload,
;                       txtscrl,
;                       txtscrl
;           };
;
            SECTION D.displatc,CLASS=DATA
subrtbl.            WORD    clearli.
            WORD    clearli.
            WORD    clearli.
            WORD    groupdi.
            WORD    indtext.
            WORD    ingrpna.
            WORD    literte.
            WORD    numeric.
            WORD    numeric.
            WORD    numeric.
            WORD    outgrpn.
            WORD    scrtxtw.
            WORD    scrtxtw.
            WORD    select.
            WORD    sheafre.
            WORD    shiperr.
            WORD    shipscr.
            WORD    statecu.
            WORD    statecu.
            WORD    grpload.
            WORD    indtext.
            WORD    traceof.
            WORD    clearer.
            WORD    varkeyl.
            WORD    fcurpos.
            WORD    glitchg.
            WORD    movstcu.
            WORD    movtmgc.
            WORD    preload.
            WORD    scrollw.
            WORD    tmginfo.
            WORD    scrtmgw.
            WORD    tracelo.
            WORD    statpro.
            WORD    unblink.
            WORD    updatet.
            WORD    dataloa.
            WORD    grpload.
            WORD    scrdir.
            WORD    scrdir.
            WORD    varkeyl.
            WORD    preload.
            WORD    txtscrl.
            WORD    txtscrl.

;static  char    abort = 0;          /* used by bookkeeping routines
;                                       to signal that processing
;                                       of the commands should be
;                                       aborted */
;
;static  char    pounds = 0;
;
            SECTION B.displatc,CLASS=BSS
abort.  BYTE    00H
pounds. BYTE    00H
```

```
;/*****************************************************************/
;
;i_displatcher ()
;{
;       dqoutptr = dqinptr = descripq;
;       return;
;}

SECTION T.displatc,CLASS=TEXT
i_displ.                                        ; CANNOT USE DE
        LD      HL, descrip.
        LD      (dqinptr.), HL
        LD      (dqoutpt.), HL
        RET ;/*****************************************************************/
;
;displatcher ()
;{
;       abort = FALSE;
;       for (pounds = 0; pounds <= MAXWEIGHT;) {   /* don't hog CPU */
;               if (dqoutptr == dqinptr)          /* no more commands */
;                       return;
;
;               if (*dqoutptr == WRAPCDE)   /* go to front of queue */
;                       dqoutptr = descripq;
;               else {                                  /* call handler */
;                       pounds += (*subrtbl[*dqoutptr]) ();
;                       if (abort)
;                               return;
;                                               /* bump ptr to next command */
;                       dqoutptr += *(dqoutptr+1);
;               };
;       };
;       return;
;} displat.
        PUSH    DE                      ; subroutine linkage
        XOR     A                       ; abort = FALSE
        LD      (abort.), A
        LD      (pounds.), A            ; pounds = 0
        LD      HL, (dqoutpt.)          ; FROM THIS POINT HL = dqoutptr
L.3     LD      A, (pounds.)            ; is pounds <= MAXWEIGHT
        CP      MAXWEIGHT
        JP      P, L.ret
        LD      A, (dqinptr.)           ; is dqinptr = dqoutptr
        CP      L
        JR      NZ, L.7
        LD      A, (dqinptr.+01H)
        CP      H
        JR      Z, L.ret                ; return
L.7     LD      A, (HL)                 ; is *dqoutptr == WRAPCDE
        CP      WRAPCDE
        JR      NZ, L.11
        LD      HL, descrip.            ; dqoutptr = descripq
        JR      L.3
L.11    LD      (dqoutpt.), HL          ; set dqoutptr
        LD      L, (HL)                 ; call *subrptr[dqoutptr]
        LD      H, 0
        ADD     HL, HL
        LD      BC, subrtbl.
        ADD     HL, BC
        LD      A, (HL)
        INC     HL
        LD      H, (HL)
        LD      L, A
        LD      BC, retpt
        PUSH    BC
        JP      (HL)
```

```
retpt   LD      HL, (dqoutpt.)          ; restore HL
        LD      A, (pounds.)            ; pounds += retval
        ADD     A, C
        LD      (pounds.), A
        LD      A, (abort.)             ; if (abort)
        OR      A
        JR      NZ, L.ret               ; return
        INC     HL                      ; dqoutptr += *(dqoutptr+1)
        LD      C, (HL)
        LD      B, O
        DEC     HL
        ADD     HL, BC
        JR      L.3
L.ret   LD      (dqoutpt.), HL          ; set dqoutptr
        POP     DE                      ; subroutine linkage
        RET ;/****************************************************************/
;
;char
;scrtmgwait ()                           /* don't do if scrolling now */
;{
;       if (tscrflag)
;               abort = TRUE;
;       else
;               return(tmgscroll());
;       return (0);
;} scrtmgw.                                ; CANNOT USE DE
        LD      A, (tscrfla.)
        OR      A
        JP      Z, tmgscro.             ; return addr already on stack
        LD      (abort.), A
        LD      BC, 00H
        RET ;/****************************************************************/
;
;char
;scrtxtwait ()                           /* don't do if scrolling now */
;{
;       if (flag || scrollflag)
;               abort = TRUE;
;       else
;               return(txtscrl());
;       return (0);
;} scrtxtw.                                ; CANNOT USE DE
        LD      A, (flag.)
        OR      A
        JR      NZ, L.52
        LD      A, (scrollf.)
        OR      A
        JP      Z, txtscrl.             ; return addr already on stack
L.52    LD      (abort.), A
        LD      BC, 00H
        RET ;/****************************************************************/
;
;char
;scrollwait ()                           /* abort if scrolling now */
;{
;       if (flag || scrollflag || tscrflag)
;               abort = TRUE;
;       return (0);
;}
```

```
scrollw.                                        ; CANNOT USE DE
        LD      A, (flag.)
        OR      A
        JR      NZ, L.33
        LD      A, (scrollf.)
        OR      A
        JR      NZ, L.33
        LD      A, (tscrfla.)
        OR      A
        JR      Z, L.13
L.33    LD      (abort.), A
L.13    LD      BC, 00H
RET
END
```

```
/***************************************************************
 *
 *      NAME:   LITERTEXT     (@(#)litertex.c      1.2)
 *
 *
 *
 *
 *              Name    Revision
 *              ----    --------
 *              SDB     Regular
 *              CJB     Removed SCCS id ("what" string)
 *
 ***************************************************************/

/*# M-E : CH09/litertext */

/*# VD : CH13/d.descripq : dqoutptr */
/*# VD : CH13/d.dispstructur : lncompose */
/*# VD : CH13/d.cntldata : moveparms */ include <cpdefs/standardefs.h>
include <iopdata/iopstruc.h.c>
include <iopdefs/ramrom.h> extern  char    *dqoutptr;
extern  char    lncompose[64];
extern  struct  blockparm       moveparms;

extern  blkmovz();

#define TXTSTRING       3
                        /* Offset from dqoutptr to the text string */
#define HORIZ   2
                        /* Offset from dqoutptr to the horz position */
#define LEN     1
                        /* Offset from dqoutptr to the command length */
#define OVERHEAD        3
                        /* number of bytes in the invoking descripq */
                        /* command which are NOT text to be copied. */

TEXT                                            /* code section */ char
litertext()
{
        moveparms.dirflg = 1;                           /* copy text */
        moveparms.bytecnt = *(dqoutptr + LEN) - OVERHEAD;
        moveparms.fromptr = dqoutptr + TXTSTRING;
        moveparms.toptr = &lncompose[*(dqoutptr + HORIZ)];
        blkmovz(&moveparms);

return (1);                     /* the weight for displatcher */
}
```

```
;*********************************************************************
;*
;*      NAME:   SHIPSCREEN    (@(#)shipscre.z80  1.4)
;*
;*
;*
;*
;*                      Name    Revision
;*                      ----    --------
;*                      SMD     Regular
;*                      SMD     corrected cursor movement
;*                      CJB     Removed SCCS id ('what' string)
;*
;*********************************************************************
;
; # M-E : CH09/shipscreen
;
;*********************************************************************
;
; # VD : CH13/d.cntldata: blinkpos
; # VD : CH13/d.dispdata: cur1point
; # VD : CH13/d.dispdata: cur1pres
; # VD : CH13/d.dispdata: cur2point
; # VD : CH13/d.dispdata: cur2pres
; # VD : CH13/d.descripq: dqoutptr
; # VD : CH13/d.dispstructur: lncompose
; # VD : CH13/d.cntldata: moveparms
;
;extern char    *blinkpos;
;extern char    *cur1point;
;extern char    cur1pres;
;extern char    *cur2point;
;extern char    cur2pres;
;extern char    *dqoutptr;
;extern char    lncompose[];
;extern struct  blockparm       moveparms;
;
;extern blkmovz();
;extern char    *findscr();
;
        NAME    shipscre
        GLOBAL  shipscr.
        GLOBAL  findscr.
        GLOBAL  blkmovz.
        GLOBAL  movepar.
        GLOBAL  lncompo.
        GLOBAL  dqoutpt.
        GLOBAL  cur2pre.
        GLOBAL  cur2poi.
        GLOBAL  cur1pre.
        GLOBAL  cur1poi.
        GLOBAL  blinkpo.
;
; * SHIPSCREEN moves part, or all, of the contents of 'lncompose'
; * to a specified display location.  Note that in the interests of
; * saving RAM, the elements of 'moveparms' are used as scratch
; * variables.
; *
; * The constants used are:
; *     BLANK - display code for a blank.
; *     CUR1  - display code for cursor 1.
; *     CUR2  - display code for cursor 2.
; *     LINEMASK - mask to turn result from 'findscr' to a line ptr
; *     VIDOFF - mask to turn off display code video bits
; *     VIDON  - mask to save display code video bits
; */
;
;#define        BLANK           0x24
;#define        CUR1            0x3B
```

```
;#define     CUR2         0x3C
;#define     LINEMASK     0xFFC0
;#define     VIDOFF       0x3F
;#define     VIDON        0xC0
;

;           TEXT                                    /* code section */
;
;char
;shipscreen ()
;{
;                                                   /* get display position */
;       moveparms.toptr = findscr(*(dqoutptr+2),*(dqoutptr+3));
;                                                   /* target line no. */
;       moveparms.fromptr = (int)moveparms.toptr & LINEMASK;
;
;

SECTION  T.shipscre,CLASS=TEXT
shipscr.
        PUSH    DE                       ; subroutine linkage
        LD      HL, (dqoutpt.)           ; push *(dqoutptr+3)
        INC     HL
        INC     HL
        INC     HL
        LD      C, (HL)
        LD      B, 0
        PUSH    BC
        DEC     HL                       ; push *(dqoutptr+2)
        LD      C, (HL)
        PUSH    BC
        CALL    findscr.
        POP     AF
        POP     AF
        LD      L, C                     ; HL = return value
        LD      H, B
        LD      (movepar.+05H), HL       ; moveparms.toptr = HL
        LD      A, L                     ; moveparms.fromptr = HL & 0xFFC0
        AND     0c0H
        LD      L, A
        EX      DE, HL                   ; DE = moveparms.fromptr
;
;       if (cur1pres) {
;               if ((cur1point) && (cur1point != moveparms.fromptr)) {
;                                                  /* replace cursor 1 */
;                       p1 = (cur1point == cur2point) ? CUR2 : BLANK;
;                       moveparms.bytecnt = 64;
;                       while (moveparms.bytecnt--)
;                               if (((p2 = *cur1point++) & VIDOFF) == CUR1)
;                                       *(cur1point-1) = (p2 & VIDON) | p1;
;               };
;               cur1pres = FALSE;
;               cur1point = moveparms.fromptr;
;
        LD      A, (cur1pre.)            ; if (cur1pres)
        OR      A
        JP      Z, L.3
        LD      HL, (cur1poi.)           ; if (cur1point)
        LD      A, H
        OR      L
        JP      Z, L.5
        LD      A, E                     ; if (cur1point !=
        CP      L                        ;     moveparms.fromptr)
        JR      NZ, L.2
        LD      A, D
        CP      H
        JP      Z, L.5
L.2     LD      B, 024H                  ; B = p1 = BLANK
        LD      A, (cur2poi.)            ; is cur1point == cur2point
```

```
            CP      L
            JR      NZ, L.4
            LD      A, (cur2poi.+01H)
            CP      H
            JR      NZ, L.4
            LD      B, 03cH                         ; p1 = CUR2
L.4         LD      C, 040H                         ; C = moveparms.bytecnt = 64
                                                    ; note HL = cur1point
L.7         LD      A, (HL)                         ; A = p2 = *cur1point
            AND     03FH                            ; & VIDOFF
            CP      03bH                            ; == CUR1
            JR      NZ, L.21
            LD      A, (HL)                         ; A = *cur1point
            AND     0C0H                            ; & VIDON
            OR      B                               ; | p1
            LD      (HL), A                         ; *cur1point =
L.21        INC     HL                              ; cur1point++
            LD      A, C
            DEC     C                               ; while (moveparms.bytecnt--)
            OR      A
            JR      NZ, L.7
L.5         LD      A, 00H                          ; cur1pres = FALSE
            LD      (cur1pre.), A
            LD      H, D                            ; HL = cur1point = moveparms.fromptr
            LD      L, E
            LD      (cur1poi.), HL
            JR      L.51
;
;           } else if (cur1point == moveparms.fromptr)
;                   cur1point = 0;
;

; note DE= moveparms.fromptr
L.3         LD      A, (cur1poi.)                   ; if (cur1point == moveparms.fromptr)
            CP      E
            JR      NZ, L.51
            LD      A, (cur1poi.+01H)
            CP      D
L.41        JR      NZ, L.51
            LD      HL, 00H                         ; cur1point = 0
            LD      (cur1poi.), HL
;
;           if (cur2pres) {
;                   if ((cur2point) && (cur2point != moveparms.fromptr)) {
;                                           /* replace cursor 2 */
;                           p1 = (cur1point == cur2point) ? CUR1 : BLANK;
;                           moveparms.bytecnt = 64;
;                           while (moveparms.bytecnt--)
;                                   if (((p2 = *cur2point++) & VIDOFF) == CUR2)
;                                           *(cur2point-1) = (p2 & VIDON) | p1;
;                   };
;                   cur2pres = FALSE;
;                   cur2point = moveparms.fromptr;
;
L.51        LD      A, (cur2pre.)                   ; if (cur2pres)
            OR      A
            JP      Z, L.12
            LD      HL, (cur2poi.)                  ; if (cur2point)
            LD      A, L
            OR      H
            JP      Z, L.32
            LD      A, E                            ; if (cur2point == moveparms.fromptr)
            CP      L
            JR      NZ, L.61
            LD      A, D
            CP      H
            JP      Z, L.32
```

```
L.61     LD      B, 024H                 ; B = p1 = BLANK
         LD      A, (cur1poi.)           ; is cur1point == cur2point
         CP      L
         JR      NZ, L.02
         LD      A, (cur1poi.+01H)
         CP      H
         JR      NZ, L.02
         LD      B, 03bH                 ; p1 = CUR1
L.02     LD      C, 040H                 ; C = moveparms.bytecnt = 64
                                         ; note HL = cur2point
L.07     LD      A, (HL)                 ; A = p2 = *cur2point
         AND     03FH                    ; & VIDOFF
         CP      03CH                    ; == CUR2
         JR      NZ, L.08
         LD      A, (HL)                 ; A = *cur2point
         AND     0C0H                    ; & VIDON
         OR      B                       ; | p1
         LD      (HL), A                 ; *cur2point =
L.08     INC     HL                      ; cur2point++
         LD      A, C                    ; while (moveparms.bytecnt--)
         DEC     C
         OR      A
         JR      NZ, L.07
L.32     LD      A, 00H                  ; cur2pres = FALSE
         LD      (cur2pre.), A
         LD      H, D                    ; HL = cur2point = moveparms.fromptr
         LD      L, E
         LD      (cur2poi.), HL
         JR      L.33
;
;        } else if (cur2point == moveparms.fromptr)
;                 cur2point = 0;
;

; note DE= moveparms.fromptr
L.12     LD      A, (cur2poi.)           ; if (cur2point == moveparms.fromptr)
         CP      E
         JR      NZ, L.33
         LD      A, (cur2poi.+01H)
         CP      D
         JR      NZ, L.33
         LD      HL, 00H                 ; cur2point = 0
         LD      (cur2poi.), HL
;
;        moveparms.dirflg = 1;           /* set up 'blockmove' parms */
;        moveparms.bytecnt = *(dqoutptr+4);
;        moveparms.fromptr = &Incompose[0] + *(dqoutptr+3);
;
L.33     LD      A, 01H                  ; moveparms.dirflg = 1
         LD      (movepar.), A
         LD      HL, (dqoutpt.)          ; moveparms.bytecnt = *(dqoutptr+4)
         INC     HL
         INC     HL
         INC     HL
         INC     HL
         LD      A, (HL)
         LD      (movepar.+01H), A
         XOR     A
         LD      (movepar.+02H), A
         DEC     HL                      ; moveparms.fromptr = &Incompose[0]
         LD      C, (HL)                 ;                   + *(dqoutptr+3)
         LD      B, 0
         LD      HL, Incompo.
         ADD     HL, BC
         LD      (movepar.+03H), HL
;
;                                        /* move to display */
```

```
;       if (((int)blinkpos & LINEMASK) == ((int)moveparms.toptr & LINEMASK)){
;               intdisable();           /* save field cursor video */
;               p1 = *blinkpos & 0xC0;
;               blkmovz(&moveparms);
;               *blinkpos = p1 | (*blinkpos & 0x3F);
;               intenable();

LD      HL, (blinkpo.)          ; DE = blinkpos & LINEMASK
        LD      A, L
        AND     0c0H
        LD      L, A
        EX      DE, HL
        LD      HL, (movepar.+05H)      ; HL = moveparms.toptr & LINEMASK
        LD      A, L
        AND     0c0H
        LD      L, A
        LD      A, E
        CP      L                       ; is HL == DE
        JR      NZ, L.73
        LD      A, D
        CP      H
        JR      NZ, L.73
        DI                              ; intdisable()
        LD      HL, (blinkpo.)          ; D = p1 = *blinkpos & 0xC0
        LD      A, (HL)
        AND     0C0H
        LD      D, A
        LD      HL, movepar.            ; blkmovz(&moveparms)
        PUSH    HL
        CALL    blkmovz.
        POP     AF
        LD      HL, (blinkpo.)          ; A = *blinkpos & 0x3F
        LD      A, (HL)
        AND     03FH
        OR      D                       ; | p1
        LD      (HL), A                 ; = *blinkpos
        EI                              ; intenable()
        JR      L.14
;
;       } else
;               blkmovz(&moveparms);

L.73    LD      HL, movepar.
        PUSH    HL
        CALL    blkmovz.
        POP     AF
;
;       return(1);
;}

L.14    LD      BC, 01H
        POP     DE                      ; subroutine linkage
        RET
        END
```

```
; ****************************************************************
; *
; *    MODULE NAME:  TXTSCRL   (@(#)txtscrl.z80        1.3)
; *
; *
; *
; *
; *
; *                       Name     Revision
; *                       ----     --------
; *                       SMD      Regular
; *                       KM       Regular
; *                       SMD      assembler version
; *                       CJB      Removed SCCS id ('what' string)
; *
```

```
; ********************************************************************
;# M-SF,A-E : CH09/txtscrl
        NAME    txtscrl
        GLOBAL  txtscrl.

;               *********************
;               *                   *
;               *   LOCAL DEFINES   *
;               *                   *
;               *********************

NOCURSOR        EQU     00H             ; curxpoint value for no cursor
SBUF            EQU     01FH            ; findscr code for scroll buffer ;               *************************
;               *                       *
;               *   EXTERNAL ROUTINES   *
;               *                       *
;               *************************

GLOBAL  findscr.

;               *************************
;               *                       *
;               *   EXTERNAL VARIABLES  *
;               *                       *
;               *************************

;# VD : CH13/d.dispdata:    cur1point
;# VD : CH13/d.dispdata:    cur1pres
;# VD : CH13/d.dispdata:    cur2point
;# VD : CH13/d.dispdata:    cur2pres
;# VD : CH13/d.textscroll:  direction
;# VD : CH13/d.descripq:    dqoutptr
;# VD : CH13/d.textscroll:  flag
;# VD : CH13/d.dispstructur: lncompose
;# VD : CH13/d.textscroll:  rastcnt
;# VD : CH13/d.textscroll:  rastrate
;# VD : CH13/d.textscroll:  ratetype GLOBAL  cur1poi.
        GLOBAL  cur1pre.
        GLOBAL  cur2poi.
        GLOBAL  cur2pre.
        GLOBAL  directi.
        GLOBAL  dqoutpt.
        GLOBAL  flag.
        GLOBAL  lncompo.
        GLOBAL  rastcnt.
        GLOBAL  rastrat.
        GLOBAL  ratetyp.

;               **********************
;               *                    *
;               *   MODULE GLOBALS   *
;               *                    *
;               **********************

;               FORMER C STATIC VARIABLES
;
;static char    cmdtype = 0;                            /* saves ROM */
```

SECTION T.txtscrl,CLASS=TEXT

```
;                /***************************
;                *                           *
;                *    CODE BEGINS HERE       *
;                *                           *
;                ***************************/
;
;/*
; * TXTSCRL handles txtscroll and scroll commands from the CP.
; *
; * The constants used are:
; *     FWD - 'blkmovz' code for a forward data move
; *     LINELEN - length in characters of a display line
; *     NOCURSOR - 'curxpoint' value indicating no cursor
; *     SBUF - 'findscr' code for the scroll buffer line
; */

;char
;txtscrl ()
;{
;        cmdtype = *dqoutptr;

txtscrl.
        PUSH    DE                      ; subroutine linkage
        LD      HL, (dqoutpt.)          ; cmdtype=A
        LD      A, (HL)

;                        /* set direction and determine command type */
;       if (cmdtype == TXTSCT)
;               direction = FALSE;
;       else if (cmdtype == TXTSCB)
;               direction = TRUE;
;       else {
;               while (flag)            /* wait for last operation */
;                       ;
;               direction = (cmdtype == SCLB);
;               cmdtype = FALSE;
;       }

LD      B, 00H                  ; direction=B
        CP      0bH
        JR      Z, L.5
        LD      B, 01H
        CP      0cH
        JR      Z, L.5
        LD      C, A                    ; save cmdtype
L.31    LD      A, (flag.)
        OR      A
        JR      NZ, L.31
        LD      A, C
        CP      02bH
        JR      Z, L.4                  ; direction already TRUE
        LD      B, 00H
L.4     XOR     A
L.5     LD      C, A                    ; cmdtype=C
        LD      A, B
        LD      (directi.), A ;       rastcnt = *(dqoutptr + 2);      /* load textscroll values */
;       rastrate = *(dqoutptr + 3);
;       ratetype = *(dqoutptr + 4);

LD      HL, (dqoutpt.)
        INC     HL
        INC     HL
        LD      A, (HL)
        LD      (rastcnt.), A
        INC     HL
```

```
              LD      A, (HL)
              LD      (rastrat.), A
              INC     HL
              LD      A, (HL)
              LD      (ratetyp.), A ;          if (cmdtype) {                           /* txtscroll command */
;                                       /* move 'lncompose' to scroll buffer */
;                  moveparms.toptr = findscr(SBUF,0);
;                  moveparms.fromptr = lncompose;
;                  moveparms.dirflg = FWD;
;                  moveparms.bytecnt = LINELEN;
;
;                  blkmovz(&moveparms); /* do cursor bookkeeping */

LD      A, C
              OR      A
              JR      Z, L.71
              LD      HL, 00H
              PUSH    HL
              LD      HL, SBUF
              PUSH    HL
              CALL    findscr.              ; &scroll buffer=BC
              POP     AF
              POP     AF
              PUSH    BC                    ; save &scroll buffer
              LD      E, C                  ; target address
              LD      D, B
              LD      HL, lncompo.          ; source address
              LD      BC, 040H              ; byte count
              LDIR                          ; transfer (instead of call)

;          if (cur1pres)
;                  cur1point = moveparms.toptr;
;          else if (cur1point == moveparms.toptr)
;                  cur1point = NOCURSOR;

POP     HL                    ; &scroll buffer=HL
              LD      A, (cur1pre.)
              OR      A
              JR      Z, L.12
              LD      (cur1poi.), HL
              JR      L.32
L.12          LD      A, (cur1poi.)
              CP      L
              JR      NZ, L.32
              LD      A, (cur1poi.+01H)
              CP      H
              JR      NZ, L.32
              LD      DE, NOCURSOR
              LD      (cur1poi.), DE ;          if (cur2pres)
;                  cur2point = moveparms.toptr;
;          else if (cur2point == moveparms.toptr)
;                  cur2point = NOCURSOR;

L.32          LD      A, (cur2pre.)
              OR      A
              JR      Z, L.72
              LD      (cur2poi.), HL
              JR      L.13
L.72          LD      A, (cur2poi.)
              CP      L
              JR      NZ, L.13
              LD      A, (cur2poi.+01H)
              CP      H
              JR      NZ, L.13
              LD      DE, NOCURSOR
              LD      (cur2poi.), DE
```

```
;                       cur1pres = FALSE;
;                       cur2pres = FALSE;

L.13    XOR     A
        LD      (cur1pre.), A
        LD      (cur2pre.), A

;               if (!rastcnt)                   /* don't scroll right now */
;                       return(1);

LD      A, (rastcnt.)
        OR      A
        JR      Z, L.73

;               flag = TRUE;                    /* tell 'scrolldemon' to start */
;               return(1);

L.71    LD      A, 01H
        LD      (flag.), A
L.73    LD      BC, 01H
        POP     DE                              ; subroutine linkage
        RET
        END
```

```
; *********************************************************************
; *
; *     MODULE NAME:    SCROLLDEMON, I_SCROLLDEMON  (@(#)scrollde.z80   1.3)
; *
; *
; *
; *
; *                     Name    Revision
; *                     ----    --------
; *                     SMD     Regular
; *                     CJB     Removed SCCSid ('what' string)
; *                     SMD     corrected ticks/raster scrolling
; *
; *********************************************************************
;
;
; # M-SF,A-E : CH09/scrolldemon
;
;                       /******************
;                        *                *
;                        *  LOCAL DEFINES *
;                        *                *
;                        ******************/
;
;#define        NOEXTEND        0x00FF
;#define        VSMAX           0x00AF
;#define        VSMIN           0x30
;
;                       /************************
;                        *                      *
;                        *  EXTERNAL VARIABLES  *
;                        *                      *
;                        ************************/
;
; # VD : CH13/d.textscroll : direction
; # VD : CH13/d.textscroll : flag
; # VD : CH13/d.textscroll : rastcnt
; # VD : CH13/d.textscroll : rastrate
; # VD : CH13/d.textscroll : ratetype
; # VD : CH13/d.dispdata : scrollflag
; # VD : CH13/d.dispdata : vscopy
; # VD : CH13/d.display : vscroll
; # VD : CH13/d.dispdata : vwcopy
; # VD : CH13/d.display : vwrap
;
```

```
;extern  char     direction;
;extern  char     flag;
;extern  char     rastcnt;
;extern  char     rastrate;
;extern  char     ratetype;
;extern  char     scrollflag;
;extern  char     vscopy;
;extern  char     vscroll;
;extern  char     vwcopy;
;extern  char     vwrap;
        NAME     scrollde
        GLOBAL   scrolld.
        GLOBAL   i_scrol.
        GLOBAL   vwrap.
        GLOBAL   vwcopy.
        GLOBAL   vscroll.
        GLOBAL   vscopy.
        GLOBAL   scrollf.
        GLOBAL   ratetyp.
        GLOBAL   rastrat.
        GLOBAL   rastcnt.
        GLOBAL   flag.
        GLOBAL   directi.

;
;              /**********************
;              *                      *
;              *   MODULE GLOBALS     *
;              *                      *
;              **********************/
;

;
;       BSS                           /* uninitialized variable section */
;
;static  char    delta = 0;           /* h/w register change for scroll */
;static  char    locdir = {0};            /* local copy of 'direction' */
;static  char    locrate = {0};           /* local copy of 'rastrate' */
;static  char    loctype = {0};           /* local copy of 'ratetype' */
;static  char    rastersleft = {0};       /* rasters left to scroll */
;static  char    timeaccum = {0};         /* ticks since last scroll */
;

SECTION B.scrollde,CLASS=BSS
locdir. BYTE    00H
locrate.        BYTE    00H
loctype.        BYTE    00H
rasters.        BYTE    00H
timeacc.        BYTE    00H ;
;              /***************************
;              *                           *
;              *     CODE BEGINS HERE      *
;              *                           *
;              ***************************/
;
;/*
; * SCROLLDEMON scroll text onto the display.
; *
; * The constants used are:
; *     NOEXTEND - mask to defeat sign extension
; *     VSMAX - maximum legal value for 'vscroll'
; *     VSMIN - minimum legal value for 'vscroll'
; */
;
;       TEXT                                          /* code section */
;
```

```
;/*********************************************************************/
;
;i_scrolldemon ()
;{
;        flag = FALSE;
;        rastersleft = 0;
;        return;
;}
;
        SECTION T.scrollde,CLASS=TEXT
i_scrol.
                                        ; NOTE DE CANNOT BE USED
        XOR     A                       ; flag = FALSE
        LD      (flag.), A
        LD      (rasters.), A           ; rastersleft = 0
        RET ;
;/*********************************************************************/
;
;scrolldemon()
;{
;        if (flag) {                                   /* start a scroll */
;                if (scrollflag) {         /* finish previous scroll */
;                        delta = rastersleft;
;                        scrldelta();
;                }
;                flag = FALSE;
;                locdir = direction;
;
; NOTE: C is used for the variable delta scrolld.
                                        ; NOTE DE CANNOT BE USED
        LD      A, (flag.)              ; if (flag)
        OR      A
        JR      Z, L.3
        LD      HL, rasters.            ; HL = &rastersleft in this section
        LD      A, (scrollf.)
        OR      A
        JR      Z, L.5
        LD      C, (HL)                 ; delta = rastersleft
        CALL    scrldel.
        LD      HL, rasters.            ; restore HL
L.5     XOR     A                       ; flag = FALSE
        LD      (flag.), A
        LD      A, (directi.)           ; locdir = direction
        LD      (locdir.), A
;
;                if (rastrate) {                        /* slow scroll */
;                        if ((rastersleft = rastcnt)) {
;                                locrate = rastrate;
;                                timeaccum = 0;
;                                scrollflag = TRUE;
;                                if ((loctype = ratetype)) {
;                                                       /* rasters/tick */
;                                        if (locrate < rastersleft) {
;                                                delta = locrate;
;                                                rastersleft -= locrate;
;                                        } else {
;                                                delta = rastersleft;
;                                                rastersleft = 0;
;                                        }
;                                } else {               /* ticks/raster */
;                                                       /* scroll a pixel */
;                                        rastersleft--;
;                                        delta = 1;
;                                }
```

```
;                    } else {                              /* input error */
;                            scrollflag = FALSE;
;                            return;
;                    }
;            } else {                                      /* immediate scroll */
;                    delta = rastcnt;
;                    rastersleft = 0;
;            }
;

LD      A, (rastrat.)            ; if (rastrate)
          OR      A
          JR      Z, L.7
          LD      A, (rastcnt.)            ; if ((rastersleft = rastcnt))
          LD      (HL), A
          OR      A
          JR      Z, L.11
          LD      A, (rastrat.)            ; locrate = rastrate
          LD      (locrate.), A
          XOR     A                        ; timeaccum = 0
          LD      (timeacc.), A
          INC     A                        ; scrollflag = TRUE
          LD      (scrollf.), A
          LD      A, (ratetyp.)            ; if ((loctype = ratetype))
          LD      (loctype.), A
          OR      A
          JR      Z, L.31
          LD      A, (locrate.)            ; if (locrate < rastersleft)
          CP      (HL)
          JP      P, L.51
          LD      C, A                     ; delta = locrate
          LD      A, (HL)                  ; rastersleft -= locrate
          SUB     C
          LD      (HL), A
          JR      L.72
L.7       LD      A, (rastcnt.)            ; delta = rastcnt
          LD      C, A
          LD      (HL), 00H                ; rastersleft = 0
          JR      L.72
L.11      XOR     A                        ; scrollflag = FALSE
          LD      (scrollf.), A
          RET
L.31      DEC     (HL)                     ; rastersleft--
          LD      C, 01H                   ; delta = 1
          JR      L.72
L.51      LD      C, (HL)                  ; delta = rastersleft
          LD      (HL), 00H                ; rastersleft = 0
          JR      L.72

;    } else if (scrollflag) {                    /* scroll in progress */
;            if (loctype) {                      /* rasters/tick */
;                    if (locrate < rastersleft) {
;                            delta = locrate;
;                            rastersleft -= locrate;
;                    } else {
;                            delta = rastersleft;
;                            rastersleft = 0;
;                    }
;            } else {                            /* ticks/raster */
;                    if (++timeaccum == locrate) {
;                            rastersleft--;      /* scroll a pixel */
;                            timeaccum = 0;
;                            delta = 1;
;                    } else {
;                            return;             /* no scroll this time */
;                    }
;            }
;    } else {                                    /* nothing to do this time */
;            return;
;    }
```

```
L.3     LD      A, (scrollf.)           ; if (scrollflag)
        OR      A
        RET     Z                       ; else return
        LD      HL, rasters.            ; HL = &rastersleft in this section
        LD      A, (loctype.)           ; if (loctype)
        OR      A
        JP      Z, L.33
        LD      A, (locrate.)           ; if (locrate < rastersleft)
        CP      (HL)
        JP      P, L.53
        LD      C, A                    ; delta = locrate
        LD      A, (HL)                 ; rastersleft -= locrate
        SUB     C
        LD      (HL), A
        JP      L.72
L.53    LD      C, (HL)                 ; delta = rastersleft
        LD      (HL), 00H               ; rastersleft = 0
        JR      L.72
L.33    LD      A, (timeacc.)           ; if (++timeaccum == locrate)
        INC     A
        LD      (timeacc.), A
        LD      B, A
        LD      A, (locrate.)
        CP      B
        RET     NZ                      ; else return
        DEC     (HL)                    ; rastersleft--
        XOR     A                       ; timeaccum = 0
        LD      (timeacc.), A
        LD      C, 01H                  ; delta = 1
;
;       scrollflag = rastersleft;       /* stop scrolling if done */
;
;       scrldelta();
;
;       return;
;}

L.72    LD      A, (HL)                 ; scrollflag = rastersleft
        LD      (scrollf.), A
        CALL    scrldel.
        RET
;
;                       /*****************************
;                        *                           *
;                        *    LOCAL SUBROUTINES      *
;                        *                           *
;                        *****************************/
;
;/*
; * LOCAL SUBROUTINE INDEX
; *
; *     scrldelta()
; *             scrolls delta pixels in the direction indicated by
; *             locdir
; */
;
;/*******************************************************************/
;
;static
;scrldelta()                            /* scroll 'delta' pixels */
;{
;                                       /* modify scrolling hardware values */
;       if (locdir) {                                   /* scroll up */
;               vscopy += delta;
;               vwcopy += delta;
;       } else {                                        /* scroll down */
;               vscopy -= delta;
;               vwcopy -= delta;
```

```
;        }
;                                                        /* keep 'vscroll' in limits */
;        if (((vscopy & NOEXTEND) < VSMIN)
;            !! ((vscopy & NOEXTEND) > VSMAX)) {
;                delta = vscopy;
;                vscopy = vwcopy;
;                vwcopy = delta;
;        }
;        vscroll = vscopy;                              /* change the hardware */
;        vwrap = vwcopy;
;        return;
;}
;
; NOTE: C is used for the variable delta scrldel.
                                                ; NOTE DE CANNOT BE USED
        LD      A, (vwcopy.)            ; H = vwcopy
        LD      H, A
        LD      A, (vscopy.)            ; L = vscopy
        LD      L, A
        LD      A, (locdir.)            ; if (locdir)
        OR      A
        JR      Z, L.15
        LD      A, L                    ; vscopy += delta
        ADD     C
        LD      L, A
        LD      A, H                    ; vwcopy += delta
        ADD     C
        LD      H, A
        JR      L.35
L.15    LD      A, L                    ; vscopy -= delta
        SUB     C
        LD      L, A
        LD      A, H                    ; vwcopy -= delta
        SUB     C
        LD      H, A
L.35    LD      A, L                    ; is (vscopy & NOEXTEND) < VSMIN
        SUB     030H
        LD      A, 00H                  ; must use LD
        SBC     A, 00H
        JP      M, L.75
        LD      C, L                    ; is (vscopy & NOEXTEND) > VSMAX
        LD      A, 0afH
        SUB     C
        LD      A, 00H                  ; must use LD
        SBC     A, 00H
        JP      P, L.55
L.75    LD      C, L                    ; delta = vscopy
        LD      L, H                    ; vscopy = vwcopy
        LD      H, C                    ; vwcopy = delta
L.55    LD      A, L                    ; vscroll = vscopy
        LD      (vscopy.), A
        LD      (vscroll.), A
        LD      A, H                    ; vwrap = vwcopy
        LD      (vwcopy.), A
        LD      (vwrap.), A
        RET
        END
```

We claim:

1. A control system connectable to a signal measurement and display instrument, comprising:

means for generating data values representative of the angular displacement and direction of rotation of a rotary control means;

means for reading said data values at a predetermined rate to provide updated status and displacement values; and means responsive to said status and displacement values for generating commands which establish operating conditions for said measurement and display instrument, means for reading said data wherein said means for generating data values includes a Gray code generator coupled to said rotary control means, a Gray code condition circuit coupled to said Gray code generator for producing an increment/decrement signal and a clock, and an up/down counter coupled to said Gray code condition circuit, wherein said up/down counter produces said data values in response to said increment/decrement signal and said clock.

2. A control system in accordance with claim 1 wherein said means for reading said data values includes first processing means operating under program control.

3. A control system in accordance with claim 2 wherein said means for generating commands comprises second processing means having stored global data and programs for selecting one of a plurality of operating modes, wherein said commands are generated to establish operating conditions in accordance with a selected operating mode.

4. A control system in accordance with claim 3 wherein one of said operating modes permits scrolling of the display of said measurement and display instrument, wherein the rate at which said display is scrolled is determined by rotation of said rotary control means.

5. A control system in accordance with claim 3 wherein one of said operating modes permits selection of displayed information by moving a cursor in response to rotation of said rotary control means.

* * * * *